(12) United States Patent
Wilde et al.

(10) Patent No.: US 6,587,421 B1
(45) Date of Patent: Jul. 1, 2003

(54) REFRACTIVE INDEX MATCHING MEANS COUPLED TO AN OPTICAL FIBER FOR ELIMINATING SPURIOUS LIGHT

(75) Inventors: Jeffrey P. Wilde, Los Gatos, CA (US); Alexander Tselikov, Fremont, CA (US); Viatcheslav Izraelian, North York (CA); John F. Heanue, San Jose, CA (US); Jerry E. Hurst, Jr., San Jose, CA (US); George R Gray, Apple Valley, MN (US); Yongwei Zhang, San Jose, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/281,753

(22) Filed: Mar. 30, 1999

Related U.S. Application Data

(63) Continuation-in-part of application No. 09/124,812, filed on Jul. 29, 1998, now Pat. No. 6,298,027.
(60) Provisional application No. 60/079,903, filed on Mar. 30, 1998, provisional application No. 60/088,192, filed on Jun. 5, 1998, provisional application No. 60/108,398, filed on Nov. 13, 1998, and provisional application No. 60/111,470, filed on Dec. 9, 1998.

(51) Int. Cl.[7] .................................................. G11B 7/00
(52) U.S. Cl. ............................ 369/112.01; 369/112.27; 369/107; 369/44.32
(58) Field of Search ...................... 369/112.02, 112.17, 369/112.27, 112.09, 44.14, 13.56, 13.32, 13.13, 13.31, 44.19, 13.28, 44.16, 44.17, 44.21, 44.22, 77.03, 107, 9.3, 44.15, 13.35, 13.4, 44.32; 372/6, 20, 102

(56) References Cited

U.S. PATENT DOCUMENTS 3,659,915 A 5/1972 Maurer et al. ......... 350/98 WG
3,737,236 A 6/1973 Borrelli .................... 356/118
3,859,643 A 1/1975 Borrelli .................... 340/174
3,942,867 A 3/1976 Ono ......................... 350/96

(List continued on next page.)

FOREIGN PATENT DOCUMENTS

EP 01169746 7/1989
EP 0 582 405 A1 2/1994

(List continued on next page.)

OTHER PUBLICATIONS

D.W. Garvey, et al. "Single–mode nonlinear–optical polymer fibers," Journal of the Optical Society of America B, vol. 13, No. 9, pp. 2017–2023, Sep. 1996.

(List continued on next page.)

*Primary Examiner*—William Korzuch
*Assistant Examiner*—Kim-Kwok Chu
(74) *Attorney, Agent, or Firm*—Robert P. Lenart, Esq.; Pietragallo, Bosick & Gordon

(57) ABSTRACT

An optical data storage system utilizes optical fibers for transfer of information to and from storage media. The storage media comprises magneto-optical storage disks. The optical fibers are low-birefringence optical fibers. As compared with conventional approaches, a polarization state conveyed by the optical fiber is accurately reproduced with reduced noise. Various noise reduction techniques are provided by substantially decreasing or eliminating spurious reflections (or the effects thereof) at end faces and of an optical fiber. In particular, various techniques, such as index matching, a cover slip method, laser modulation, or angle polishing, may be used to eliminate spurious reflections (or the effects thereof) at the front end face of the optical fiber. Various techniques, such as angle cleaving, index matching, or multi-mode fiber splicing, may be used to eliminate spurious reflections (or the effects thereof) at the back end face of the optical fiber.

22 Claims, 13 Drawing Sheets

U.S. PATENT DOCUMENTS

| | | | |
|---|---|---|---|
| 4,135,083 A | | 1/1979 | Van Alem et al. ........... 250/201 |
| 4,298,245 A | | 11/1981 | Aulich et al. ............ 350/96.29 |
| 4,337,531 A | * | 6/1982 | Willemsen ............ 369/112.17 |
| 4,368,946 A | | 1/1983 | Kaneko et al. ............ 350/3.78 |
| 4,460,989 A | | 7/1984 | Russell ........................ 369/45 |
| 4,581,529 A | | 4/1986 | Gordon ...................... 250/227 |
| 4,626,066 A | | 12/1986 | Levinson ................ 350/96.18 |
| 4,626,679 A | | 12/1986 | Kuwayama et al. ........ 250/227 |
| 4,638,153 A | | 1/1987 | Dakin ........................ 250/227 |
| 4,737,005 A | | 4/1988 | Burns et al. ............ 350/96.15 |
| 4,866,372 A | | 9/1989 | Aoshima et al. .............. 324/96 |
| 4,866,694 A | * | 9/1989 | Korth ...................... 369/44.12 |
| 4,978,190 A | | 12/1990 | Veith ....................... 350/96.18 |
| 5,033,043 A | | 7/1991 | Hayakawa .................. 369/121 |
| 5,093,884 A | | 3/1992 | Gidon et al. ................ 385/132 |
| 5,119,361 A | | 6/1992 | Tanabe ....................... 369/121 |
| 5,120,953 A | | 6/1992 | Harris .................... 250/227.2 |
| 5,137,359 A | | 8/1992 | Steele ........................ 356/350 |
| 5,152,597 A | | 10/1992 | Barnard ..................... 359/130 |
| 5,172,369 A | | 12/1992 | Chikuma et al. ........... 369/112 |
| 5,191,387 A | | 3/1993 | Ichikawa et al. ............. 356/34 |
| 5,218,582 A | | 6/1993 | Marchant ..................... 369/14 |
| 5,229,834 A | | 7/1993 | Lequime ..................... 356/365 |
| 5,245,491 A | | 9/1993 | Horie et al. ................ 360/114 |
| 5,347,297 A | | 9/1994 | Gage .......................... 346/108 |
| 5,389,779 A | | 2/1995 | Betzig et al. ............... 250/216 |
| 5,483,607 A | | 1/1996 | O'Keefe ...................... 385/11 |
| 5,535,189 A | | 7/1996 | Alon et al. ................. 369/102 |
| 5,546,482 A | | 8/1996 | Cordova et al. ............... 385/12 |
| 6,034,938 A | * | 3/2000 | Heanue et al. ........... 369/13.56 |
| 6,041,069 A | * | 3/2000 | Kashyap et al. ............ 372/102 |
| 6,081,499 A | * | 6/2000 | Berger et al. .......... 369/112.27 |
| 6,226,233 B1 | * | 5/2001 | McDanniel et al. ..... 369/13.32 |

FOREIGN PATENT DOCUMENTS

| | | |
|---|---|---|
| EP | 09297931 | 11/1997 |
| WO | 98/07060 | 2/1998 |
| WO | 98/09280 | 3/1998 |
| WO | 98/09285 | 3/1998 |
| WO | 98/09289 | 3/1998 |

OTHER PUBLICATIONS

Leslie A. Field, et al, "Micromachined 1X2 Optical Fiber Switch," The 8$^{th}$ International Conference on Solid–State Sensors and Actuators and Eurosensors IX, Digest of Technical Papers, Stockholm, Sweden, Jun. 25–29, 1995, vol. 1, Sessions A1–PD6, Papers No. 1–231, pp. 344–347.

Frank S. Barnes, et al. "Use of Optical Fiber Heads for Optical Disks," Applied Optics vol. 25 No. 22, pp. 4010–4012, Nov. 15, 1995.

Michael N. Opsasnick, et al. "Optical Fibers for Magneto–Optical Recording," Optical Data Storage '91, SPIE, vol. 1499, pp. 276–280.

* cited by examiner

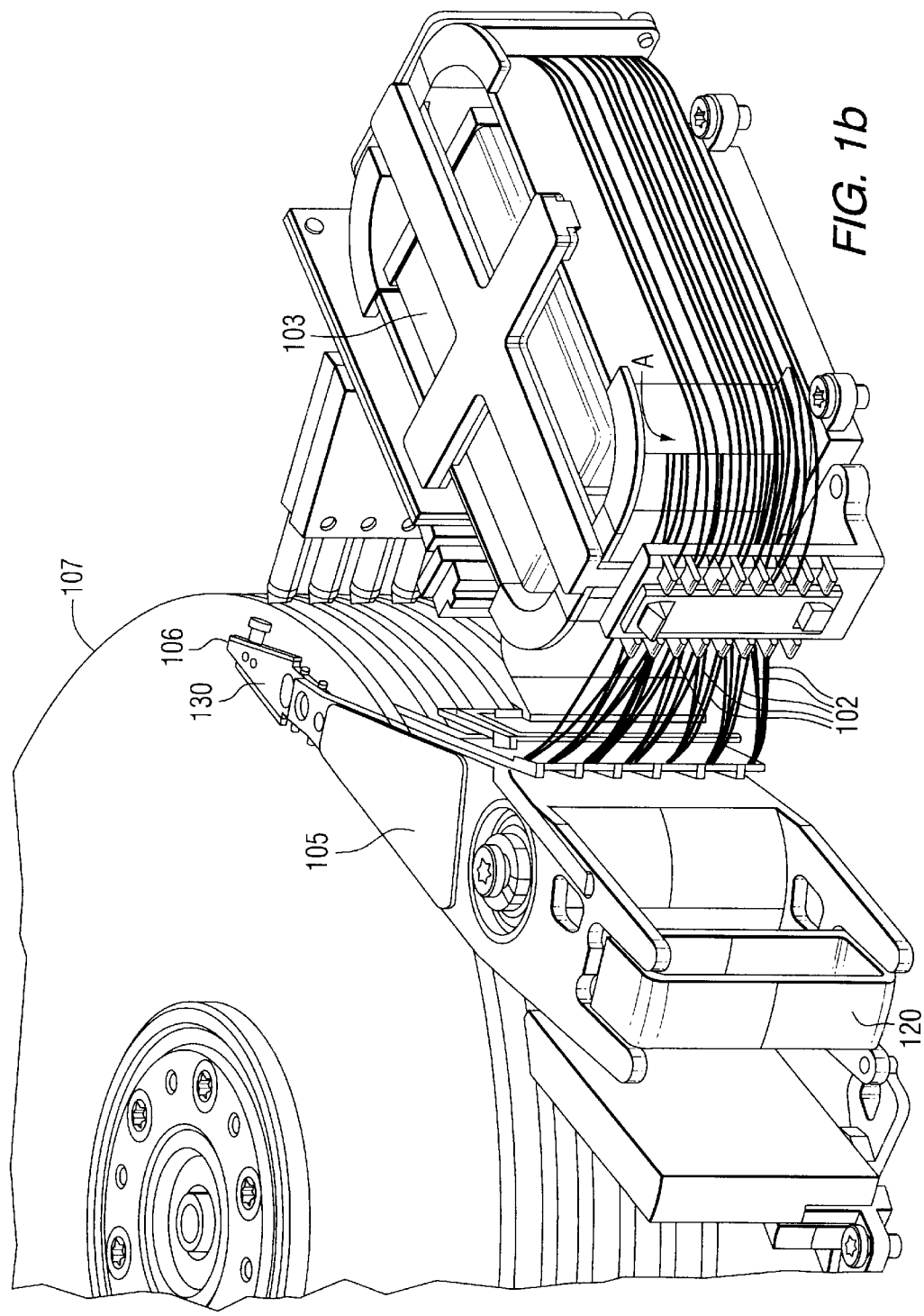

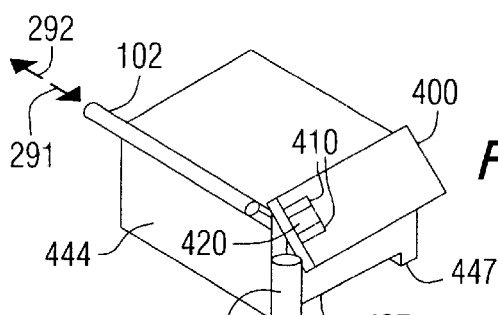
FIG. 4a
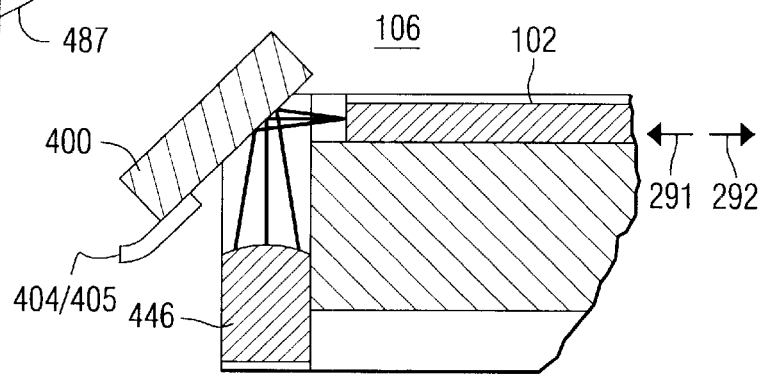
FIG. 4b
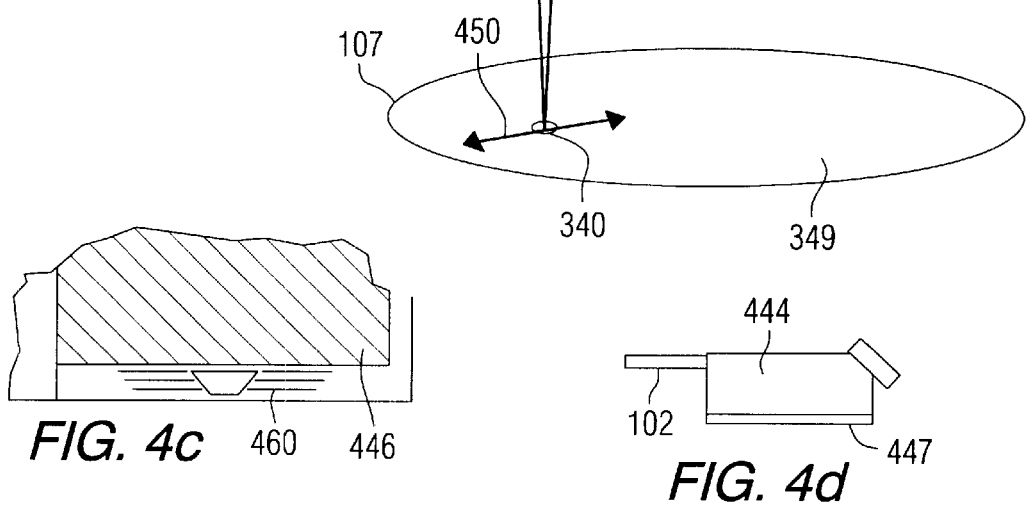
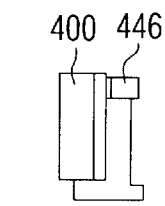
FIG. 4c
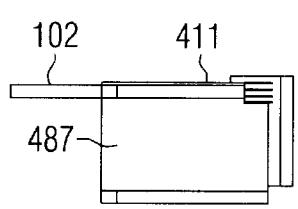
FIG. 4d
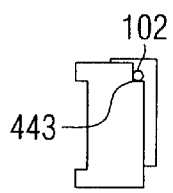
FIG. 4e    FIG. 4f    FIG. 4g

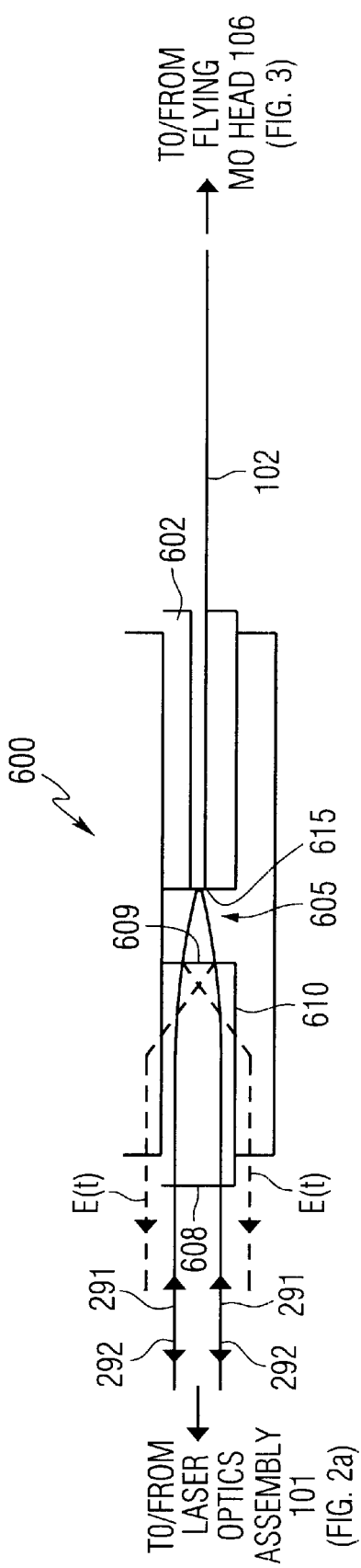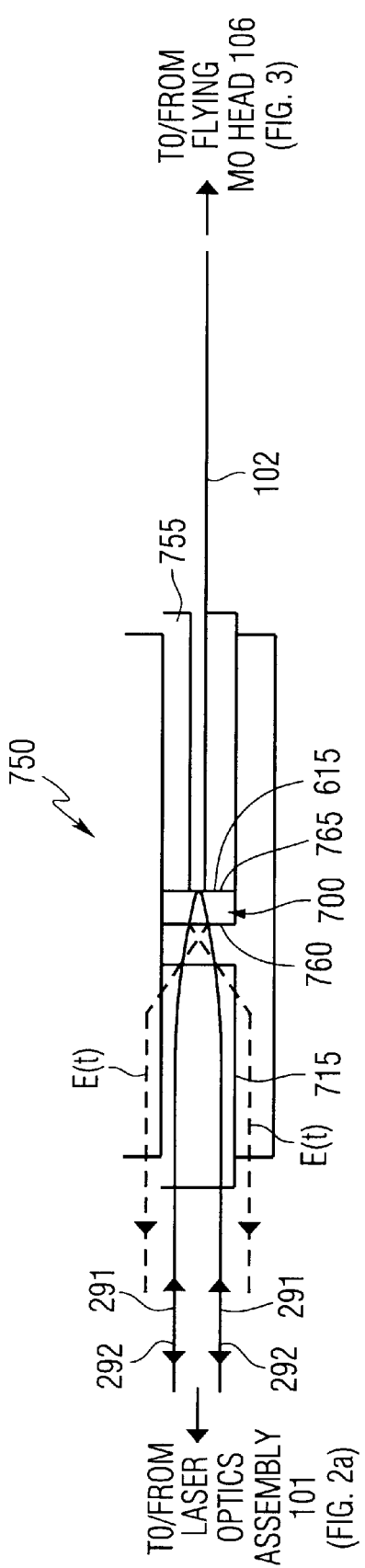

BACK COUPLING DEPENDENCE ON THE CLEAVE ANGLE

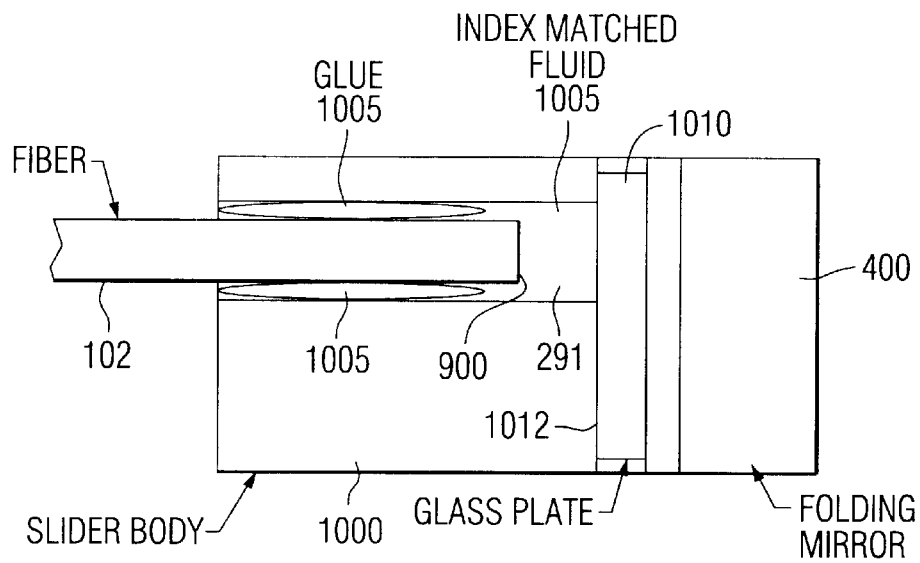
FIG. 10a HEAD DESIGN FOR BACK REFLECTION SUPPRESSION
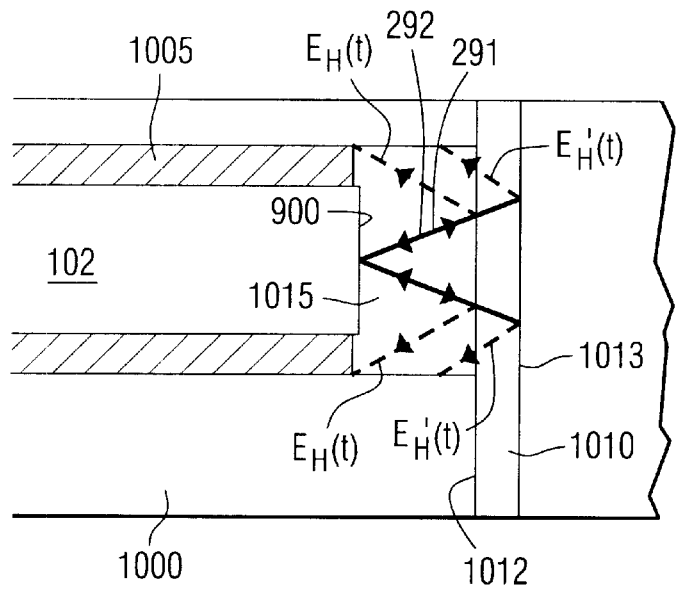
FIG. 10b
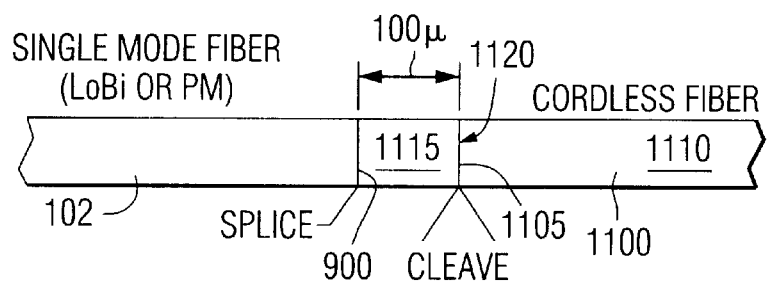
END TREATMENT PROCESS FOR THE HEAD END OF THE FIBER
FIG. 11a

REFRACTIVE INDEX MATCHING MEANS COUPLED TO AN OPTICAL FIBER FOR ELIMINATING SPURIOUS LIGHT

RELATED APPLICATIONS

The present invention is related to and claims priority from U.S. Provisional Application 60/079,903 entitled "Optical Drive Utilizing Low Birefringence Fiber," filed Mar. 30, 1998, U.S. Provisional Application 60/088,192 entitled "Laser Phase Noise Minimization In Optical Drive," filed Jun. 5, 1998, U.S. Provisional Application 60/108,398 entitled "Optical Head Design Eliminating Fiber End Back Reflection" filed Nov. 13, 1998, U.S. Provisional Application 60/111,470 entitled "Optical Fiber Coupler Using A Spliced Polarization-Maintaining Fiber," filed Dec. 9, 1998, all of which are incorporated by reference herein in their entirety. The present application is a continuation-in-part of U.S. Application 09/124,812 entitled "Low-Birefringence Optical Fiber For Use in an Optical Data Storage System," filed Jul. 29, 1998, now U.S. Pat. No. 6,298,027, issued on Oct. 2, 2001, which is incorporated by reference herein in their entirety.

BACKGROUND OF THE INVENTION

1. Field of the Invention

The present invention relates generally to optical fibers for use in data storage systems. More particularly, the present invention relates to low-birefringence optical fibers for use in magneto-optical data storage systems.

2. Background Art

In a magneto-optical storage system, using a magneto-optical (MO) recording material deposited on a rotating disk, information may be recorded on the disk as spatial variations of magnetic domains. During readout, a magnetic domain pattern modulates an optical polarization, and a detection system converts a resulting signal from optical to electronic format.

In one type of a magneto-optical storage system, a magneto-optical head assembly is located on a linear actuator that moves the head along a radial direction of the disk to position the optical head assembly over data tracks during recording and readout. A magnetic coil is placed on a separate assembly on the head assembly to create a magnetic field that has a magnetic component in a direction perpendicular to the disk surface. A vertical magnetization of polarity, opposite to that of the surrounding magnetic material of the disk medium, is recorded as a mark indicating a zero or a one by first focusing a beam of laser light to form an optical spot on the disk. The optical spot functions to heat the magneto-optical material to a temperature near or above a Curie point (a temperature at which the magnetization may be readily altered with an applied magnetic field). A current passed through the magnetic coil orients the spontaneous vertical magnetization either up or down. This orientation process occurs in the region of the optical spot where the temperature is suitably high. The orientation of the magnetization mark is preserved after the laser beam is removed. The mark is erased or overwritten if it is locally reheated to the Curie point by the laser beam during a time the magnetic coil creates a magnetic field in the opposite direction.

Information is read back from a particular mark of interest on the disk by taking advantage of the magnetic Kerr effect so as to detect a Kerr rotation of the optical polarization that is imposed on a reflected bear by the magnetization at the mark of interest. The magnitude of the Kerr rotation is determined by the material's properties (embodied in the Kerr coefficient). The sense of the rotation is measured by established differential detection schemes and, depending on the direction of the spontaneous magnetization at the mark of interest, is oriented clockwise or counter-clockwise.

Conventional magneto-optical heads, while presently providing access to magneto-optical disks with areal densities on the order of 1 Gigabit/in$^2$, tend to be based on relatively large optical assemblies which make the physical size and mass of the head rather bulky (typically 3–15 mm in a dimension). Consequently, the speed at which conventional magneto-optical heads are mechanically moved to access new data tracks on a magneto-optical storage disk is slow. Additionally, the physical size of conventional magneto-optical heads limits the spacing between magneto-optical disks. Because the volume available in standard height disk drives is limited, magneto-optical disk drives have, thus, not been available as high-capacity, high-performance commercial products. For example, a commercial magneto-optical storage device presently available provides access to only one side of a 130 mm double sided 2.6 ISO gigabyte magneto-optical disk, a 40 ms disk access time, and a data transfer rate of 4.6 MB/Sec.

N. Yamada (U.S. Pat. No. 5,255,260) discloses a low-profile flying optical head for accessing an upper and lower surface of a plurality of optical disks. The flying optical head disclosed by Yamada describes an actuating arm that has a static (fixed relative to the arm) mirror or prism mounted thereon, for delivering light to and receiving light from a phase-change optical disk. While the static optics described by Yamada provides access to both surfaces of a plurality of phase-change optical disks contained within a fixed volume, Yamada is limited by the size and mass of the optics. Consequently, the performance and the number of optical disks that can be manufactured to function within a given volume is also limited.

In applications that employ a polarization-maintaining fiber and Fabry-Perot (FP) laser to deliver polarized light from a source to a storage location, mode partition noise limits the available signal-to-noise ratio (SNR). Mode partition noise (MPN), in the form of broadband polarization fluctuations, is an intrinsic property of the FP laser that is manifest when a highly birefringent element is placed in its optical path. Polarization-maintaining optical (PM) fiber is, by design, very birefringent; therefore, MPN is very difficult to eliminate when PM fiber is utilized with a FP laser.

What is needed, therefore, is an optical data storage system that utilizes an optical fiber to convey light between a laser source and a storage location of an optical drive with a sufficient signal-to-noise ratio (SNR) and that allows an increase in the number of disks that can be placed within a given volume, as compared with conventional approaches. The improved optical head should preferably provide a high numerical aperture, a reduced head size and mass. Additionally, the optical head should improve upon conventional access to disk surfaces, disk drive access times, data transfer rates, optically induced noise, and ease of alignment and manufacture.

SUMMARY OF THE INVENTION

The present invention allows an increase in the number of storage disks that can be placed within any given volume by using low-birefringence optical fibers to transfer information to and from optical storage media. A high resonance frequency tracking servo device on a reduced profile head, in conjunction with the optical fibers, also provides improved access to storage media, improved disk drive access times, and improved data transfer rates.

An optical disk drive, in accordance with the present invention, utilizes various aspects of Winchester magnetic disk technology, for example, flying head technology. In another aspect of the present invention, a laser optics assembly directs light from an optical light source to an optical switch, which directs the light to one of a plurality of low-birefringence optical fibers coupled to one or more rotary arms, each of which support a flying optical head. Light is delivered through the optical fiber to a respective optical head for the purpose of reading and writing of data at a respective storage media with a focused optical spot. A reflected light signal from the storage media couples back through the optical head and optical fiber for subsequent processing. In one embodiment, the optical source of light comprises a Fabry-Perot (FP) laser. In another embodiment, the optical source of light comprises a stable single frequency laser source such as a distributed feedback (DFB) laser.

The optical path of the light delivered by the optical fiber is altered by a steerable micro-machined mirror mounted on the flying head. Track following and seeks to adjacent tracks are performed by rotating a central mirror portion of the mirror about an axis of rotation. A reflected light from the steerable micro-machined mirror is directed through an embedded micro-objective lens such as a GRIN (Gradient index) lens or a molded lens. A focused optical spot is scanned back and forth in a direction which is approximately parallel to the radial direction of the storage disk.

In another embodiment, track following and seeks to adjacent tracks may be performed with more than one storage media surface at a time by operating a set of steerable micro-machined mirrors independently from each other. A plurality of laser optics assembly are required in this particular embodiment.

In another aspect of the present invention, low-birefringence optical fibers are used to transfer information to and from magneto-optical storage disks. Due to inevitable stresses that are applied to the optical fibers, the SNR ratio of polarization information from the storage media may be degraded when conveyed by the optical fibers. The present invention provides an apparatus and method for increasing the SNR. In one embodiment, in-plane bend induced birefringence in low birefringence optical fibers is compensated for to increase the SNR. In another embodiment, both in-plane bend induced and out-of-plane bend induced birefringence are compensated for to increase the SNR. Out-of-plane bend induced birefringence may be compensated for by providing an optical polarization rotation element, which may comprise a rotatable ½ wave plate or a combination of a fixed ¼ wave plate and a variable-phase wave plate. In-plane bending may be compensated by providing optical phase retardation of the reflected light. Phase retardation may be provided by an optical phase retardation element comprising, a liquid crystal retarder, a combination of a fixed ¼ wave plate and a rotatable ½ wave plate, or a fixed ¼ wave plate and rotatable polarizing beam splitter. In yet another embodiment, the SNR may be increased by providing an optical source of light comprising a modulated Fabry Perot or DFB laser.

In another aspect of the present invention, various noise reduction techniques are provided by substantially decreasing or eliminating spurious reflections (or the effects thereof) at the end faces of the optical fiber. These noise reduction techniques may be applied if the laser source is, for example, FP or DFB. In particular, spurious reflections (or the effects thereof) may be eliminated at the fiber front (launch) end face near the laser source and at the fiber back (head) end face near the storage media.

As similarly stated above, to eliminate the effects of the spurious reflection from the fiber front end face (i.e., launch end face), the laser source may be modulated at a particular frequency that depends on the length of the optical fiber. As a result, the spurious reflection from the fiber front end face is time-separated from the main signal-bearing beam returning from the storage media.

In another embodiment in accordance with the present invention, the spurious reflection from the fiber front end face is eliminated by coupling the fiber front end face to a material having a refractive index equal to the refractive index of the core of the optical fiber. The material may, for example, be formed from epoxy, fluid, or other suitable materials.

In another embodiment in accordance with the present invention, the spurious reflection from the fiber front end face is eliminated by coupling the fiber front end face to a cover slip having a refractive index equal to the refractive index of the core of the optical fiber. The cover slip may, for example, be formed from glass or other suitable materials.

In another embodiment in accordance with the present invention, the effects of a spurious reflection from the fiber front end face (i.e., head end face) are eliminated by polishing the fiber front end face at a particular angle with respect to an optical propagation axis. As a result, the main signal-bearing beam is spatially separated from the spurious reflection. In addition, a GRIN lens coupled to the fiber front end face may be polished at a similar angle with respect to the optical propagation axis in order to provide optimum fiber coupling efficiency.

In another embodiment in accordance with the present invention, the effects of a spurious reflection from the fiber back end face are eliminated by cleaving the fiber back end face at a particular angle with respect to the optical propagation axis. As a result of the angle cleave, the spurious reflection is not efficiently back-coupled through the fiber and is, therefore, effectively extinguished.

In another embodiment in accordance with the present invention, the spurious reflection from the fiber back end face is eliminated by coupling the fiber back end face to a fluid or epoxy having a refractive index equal to the refractive index of the core of the optical fiber.

In another embodiment in accordance with the present invention, the spurious reflections from the fiber back end face is eliminated by coupling the fiber back end face to a coreless or multi-mode fiber portion having a refractive index equal to the refractive index of the core of the optical fiber. The coupling of the fibers is carried out, for example, by fusion splicing.

BRIEF DESCRIPTION OF THE DRAWINGS

FIG. 1b illustrates a magneto-optical storage and retrieval system with predominantly in-plane bending of a low birefringence optical fiber;

FIGS. 4a–g illustrate a flying head of the present invention in various views;

FIG. 6 is an illustration of an optical fiber coupled to a GRIN lens with an index matching material, in accordance with another embodiment of the present invention;

FIG. 7 is an illustration of an optical fiber coupled to a GRIN lens with a cover slip bonded to the fiber, in accordance with another embodiment of the present invention;

FIG. 10a illustrates an optical fiber including a head end face with a straight cleave or polish and coupled to a slider with an index matching fluid or epoxy, in accordance with another embodiment of the present invention;

FIG. 10b illustrates the propagation of the signal-bearing beams and the spurious reflection in the optical system illustrated in FIG. 10a;

FIG. 11a illustrates an optical fiber with a head end spliced to a multi-mode fiber section, in accordance with another embodiment of the present invention;

FIG. 11b illustrates the propagation of the signal-bearing beams and the spurious reflection in the optical system illustrated in FIG. 11a.

DETAILED DESCRIPTION OF THE PREFERRED EMBODIMENTS

Figure 1A:
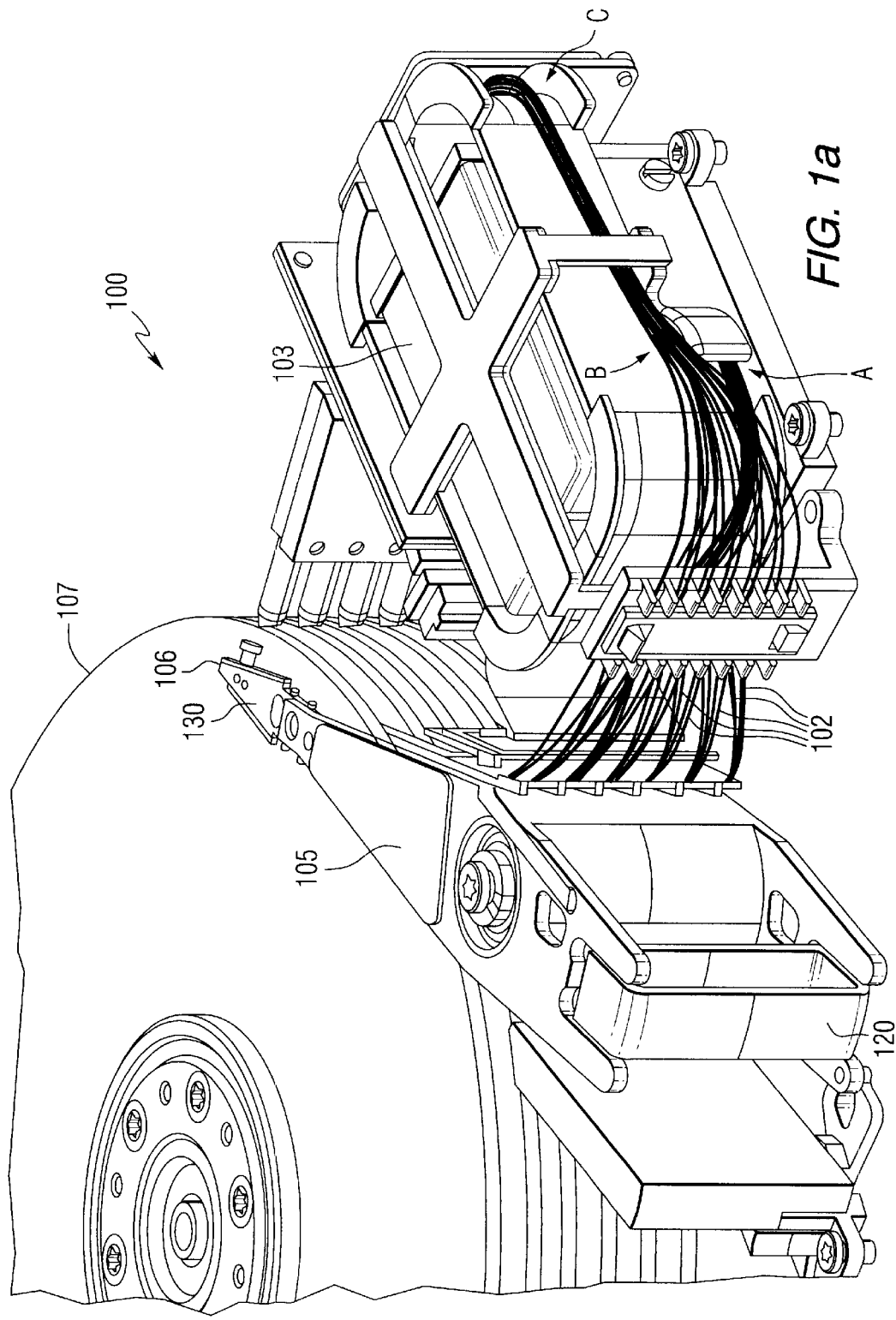
FIG. 1a illustrates one embodiment of magneto-optical storage and retrieval system with in-plane bending and out-of-plane bending of a low birefringence optical fiber.

Referring in detail now to the drawings wherein similar parts of the invention are identified by like reference numerals, there is seen in FIG. 1a a magneto-optical storage and retrieval system 100, generally illustrated in a perspective view. In one embodiment, the magneto-optical (MO) data storage and retrieval system 100 includes a set of Winchester-type flying heads 106 that are adapted for use with a set of double-sided first surface MO disks 107 (one flying head for each MO disk surface). The set of flying heads 106 (hereinafter referred to as flying MO heads) are coupled to a rotary actuator magnet and coil assembly 120 by a respective suspension 130 and actuator arm 105 so as to be positioned over the surfaces of the set of MO disks 107. In operation, the set of MO disks 107 are rotated by a spindle motor so as to generate aerodynamic lift forces between the set of flying MO heads 106 and the set of MO disks 107 and so as to maintain the set of flying MO heads 106 in a flying condition approximately 15 micro-inches above the upper and lower surfaces of the set of MO disks 107. The lift forces are opposed by equal and opposite spring forces applied by the set of suspensions 130. During non-operation, the set of flying MO heads 106 are maintained statically in a storage condition away from the surfaces of the set of MO disks 107. System 100 further includes an optics module 103 and a set of optical elements 102 (such as a set of low birefringence optical fibers) coupled thereto.

Figure 2A:
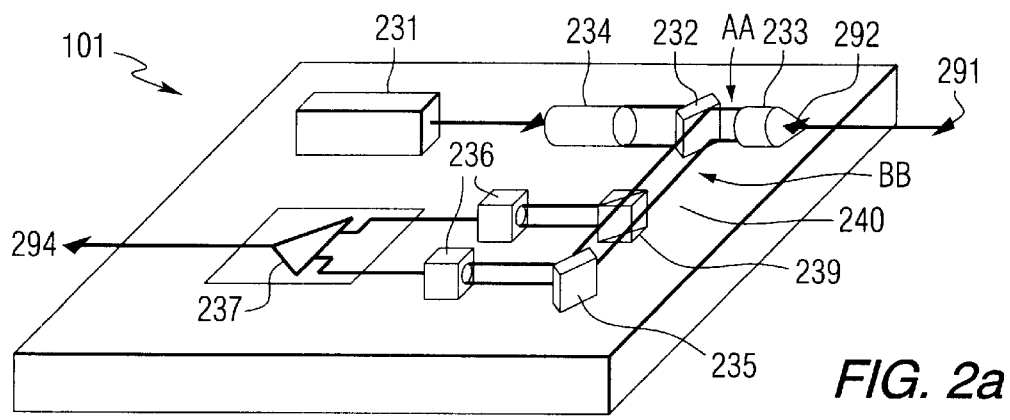
FIG. 2a illustrates a laser-optics assembly in accordance with an embodiment of the present invention.

FIG. 2a illustrates a laser-optics assembly 101 used as part of the laser optics module 103. In the present invention, the optics module 103 of FIGS. 1a and 1b comprises laser-optics assembly 101, which includes a laser source 231 such as a Fabry Perot (FP) laser or a stable single frequency laser source such as a distributed feedback (DFB) laser. A DFB laser source produces a very stable narrow-band single-frequency output due to the use of a wavelength selective grating element inside the laser cavity. In one embodiment, the laser source 231 operates at a wavelength of approximately 660 nm within a red region of the visible light spectrum; however, it is understood that laser sources operating at other wavelengths are also within the scope of the present invention. Fabry-Perot laser diodes are characterized by high-frequency fluctuations in their spectral output, which can lead to what is known in the art as mode partition noise (MPN). When linearly polarized light is launched into a highly birefringent element (with light on both principal axes), for example, a single-mode polarization-maintaining (PM) optical fiber, mode partition noise (MPN) is manifest in the form of polarization noise, which acts to reduce available signal-to-noise ratio (SNR). In MO recording, since polarization information from the MO disk 107 is desired to be read, it is important that polarization noise be kept to a minimum, which, however, is difficult to achieve when using a FP laser source and single-mode polarization-maintaining optical fiber of the prior art. The use of low-birefringence (lo-bi) fiber, on the other hand, allows an optical system to be constructed that is less prone to MPN.

As will be discussed below, various noise reduction techniques are provided for substantially decreasing or eliminating spurious reflections (or the effects thereof) at the end faces of an optical fiber 102. These noise reduction techniques may be applied if the laser source is, for example, FP or DFB.

The laser-optics assembly 101 further includes: collimating optics 234, a leaky beam splitter 232, and a coupling lens 233. The laser-optics assembly 101 directs a P polarized laser beam 291 from the laser source 231 through the leaky beam splitter 232 and coupling lens 233 towards the optical switch 104. The laser-optics assembly 101 also receives S and P polarization components of a reflected laser beam 292 from the surface of a particular MO disk 107. The reflected laser beam 292 is directed by the coupling lens 233 and is routed by the leaky beam splitter 232 towards a differential detector 240 comprising: a polarizing beam splitter 239, a mirror 235, and a set of photo-diodes 236. After optical-to-electrical signal conversion by the set of photo-diodes 236, the differential signal is processed by the differential amplifier 237 and is output as signal 294. The differential detector 240 measures the optical power of the orthogonal S and P polarization components of the reflected laser beam 292, with a differential signal being preferably a sensitive measure of polarization rotation induced by a Kerr effect at the surface of the particular MO disk 107. As will be discussed below, in particular embodiments of the present invention, the laser-optics assembly 101 may further include a variety of optical components at locations indicated at AA and BB to provide optical phase retardation and/or optical polarization rotation of the laser beams 291 and 292.

Figure 3:
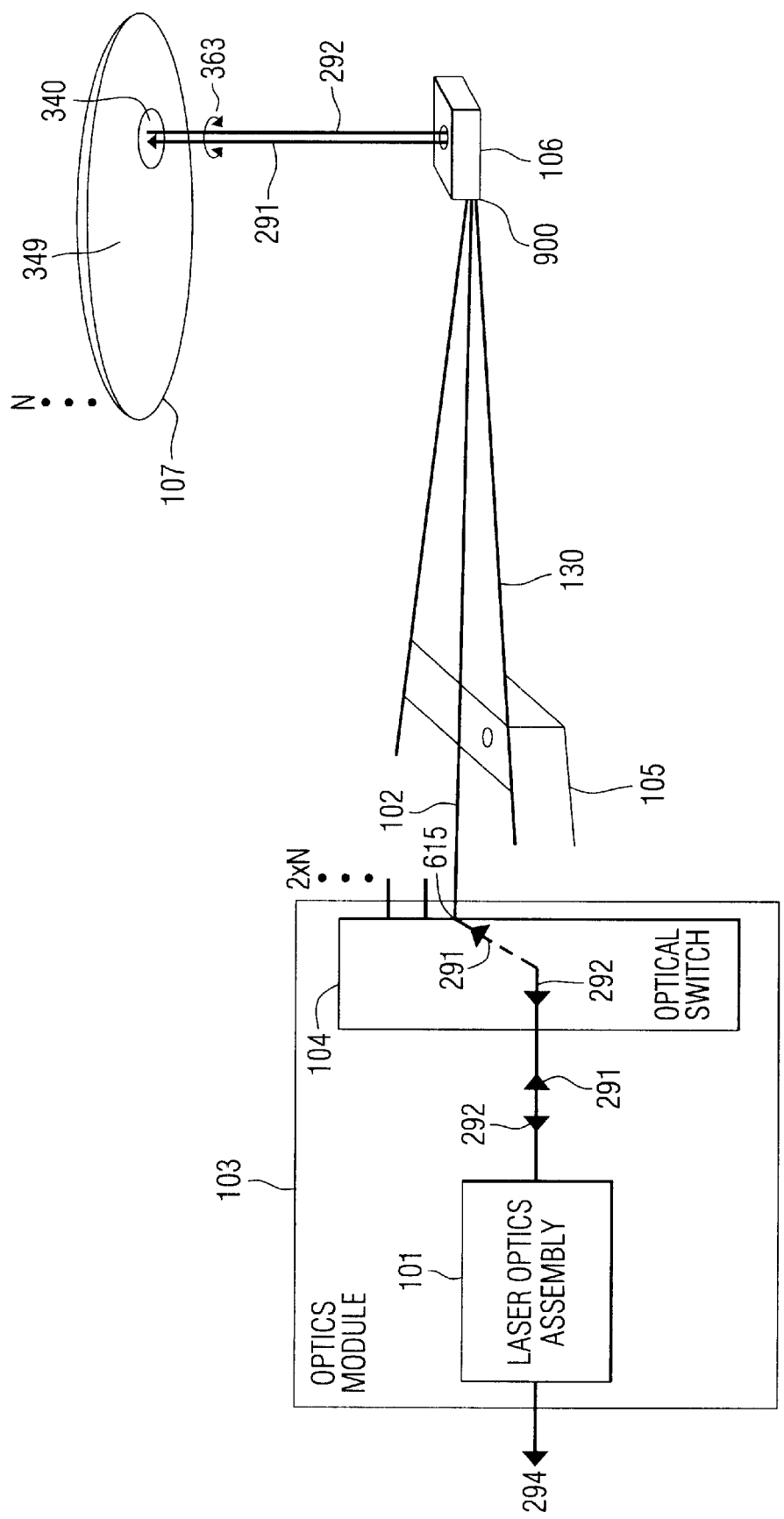
FIG. 3 illustrates an optics module comprising an optical switch.

FIG. 3 illustrates the optics module 103 comprising an optical switch 104. The optical switch 104 is disposed between the set of optical fibers 102 and the laser optics-assembly 101 and is shown in a representative optical path that includes one of the set of optical fibers 102, one of the set of flying MO heads 106, and one of the set of MO disks 107. The optical switch 104 provides sufficient degrees of selectivity so as to direct the outgoing laser beam 291 towards a respective proximal end of a particular optical fiber 102. The outgoing laser beam 291 exits a distal end of the optical fiber 102 and is directed through the flying MO head 106 onto a surface recording layer 349 of a respective MO disk 107.

During the writing of information, the outgoing laser beam 291 lowers a coercivity of the surface recording layer 349 by heating a selected spot of interest 340 to approximately the Curie point of the MO recording layer 349. The optical intensity of outgoing laser beam 291 is held constant, while a time varying vertical bias magnetic field is used to define a pattern of "up" or "down" magnetic domains perpendicular to the MO disk 107. This technique is known as magnetic field modulation (MFM). Alternatively, outgoing laser beam 291 may be modulated in synchronization with the time varying vertical bias magnetic field at the spot of interest 340 in order to better control domain wall locations and reduce domain edge jitter. Subsequently, as the selected spot of interest 340 cools at the surface layer 349, information is encoded at the surface of the respective spinning disk 107.

During the readout of information, the outgoing laser beam 291 (at a lower power compared to writing) is selectively routed to the MO disk 107 such that upon its reflection from the spot of interest 340 the Kerr effect causes a polarization state of the reflected laser beam 292 to be rotated either clockwise or counter clockwise (as indicated with arrow 363). The aforementioned optical path is bi-directional in nature. Accordingly, the reflected laser beam 292 is received through the flying MO head 106 and enters the distal end (head end) 900 of the optical fiber 102. The reflected laser beam 292 is directed by the optical fiber 102 towards the optical switch 104 and is selectively routed by the optical switch 104 towards the laser-optics assembly 101 for subsequent optical-to-electrical signal conversion.

Referring back to FIG. 1a, in one embodiment, the set of optical fibers 102 of the present invention comprises single-mode low-birefringence optical fibers. The present invention identifies that by using an optical fiber that is designed to have low birefringence, a fiber that is known in the optical fiber art as low-birefringence (or lo-bi) optical fiber, mode partition noise may be reduced to achieve an acceptable signal-to-noise ratio (SNR). The low birefringence of lo-bi optical fiber contrasts with the inherent high birefringence of single-mode polarization-maintaining optical fibers, also known as PM optical fiber. Lo-bi fiber can be provided as "spun fiber," which is spun from a slightly birefringent fiber preform during a fiber drawing process. Geometrical twisting is frozen into the spun fibers when cooled. If the spin rate is sufficient, the effects of bend-induced linear birefringence or birefringence due to anisotropic thermal stress can be overwhelmed by the effective circular birefringence introduced by the spinning. Most single-mode optical fibers exhibit some degree of linear birefringence caused by localized internal stresses. Spun fibers are the exceptions in the sense that rapid rotation of the preform during the draw process produces an averaging effect that leads to low intrinsic linear birefringence for propagation lengths spanning several rotation periods. It is understood that the present invention need not be limited to lo-bi fibers that are spun, as lo-bi optical fibers manufactured using other techniques (e.g., carefully designed preforms and special draw techniques) are also known in the art. In one embodiment of the present invention, the set of lo-bi optical fibers 102 comprises: a phase retardation of about 1–2 degrees per meter, an operating wavelength of approximately 660 nm, a cutoff wavelength of about 580–600 nm, a cladding diameter of approximately 80 microns, a dual acrylate jacket with a diameter of about 160–190 microns, an operational temperature range of about 0–70 degrees C, a mode field diameter of approximately 4.0 microns, and a mode field ellipticity of less than about 5%.

As illustrated in FIG. 1a, the set of lo-bi optical fibers 102 are coupled at the distal ends to respective ones of the set of flying MO heads 106, are routed along respective ones of the set of actuator arms 105 and set of suspensions 130, are routed around the optics module 103, and are coupled at the proximal ends to the optics module 103. Because of limitations imposed by a limited volume present in the system 100, the set of optical fibers 102 may require routing in other than a co-linear and/or a co-planar manner, which in turn may stress the optical fibers 102 and thus induce birefringence in the optical fibers 102. The optical fibers 102 exit the optic module 103 at illustrated point A and are grouped together and wound around the optics module 103. The extra windings provide extra fiber length to facilitate assembly and rework if necessary. The fibers are preferably routed in such a way that a majority of static bending occurs in a single plane (referred to hereafter as in-plane bending). An example of in-plane bending of the optical fibers 102 is illustrated at point C. At some point the fibers 102 fan out to their respective heads, for example starting at illustrated point B; thus, there may also be some out-of-plane bending between the optical fibers 102, which may alter the local orientation of the birefringence, but if the bend radius is kept sufficiently large, then the magnitude of the out-of-plane birefringence may be relatively small. Bend induced birefringence can be characterized by (1) a magnitude that is proportional to $(R_{fiber}/R_{bend})^2$ where $R_{fiber}$ is the fiber cladding radius and $R_{bend}$ is the bend radius, and (2) an orientation such that one axis is in the plane of bending and the other axis is perpendicular to the plane. If not for the bending of the set of optical fibers 102, the outgoing and the reflected laser beams 291 and 292 would in theory experience the set of optical fibers 102 with low-birefringence, similar to a set of free space optical paths. However, the polarization rotation information conveyed by the set of optical fibers 102 may be degraded by the aforementioned bend induced birefringence in the set of lo-bi optical fibers 102. Accordingly, in one aspect of the invention, there is provided a method and apparatus for compensation thereof, including optical elements in the optical paths of the laser beams 291 and/or 292 to provide optical phase retardation and/or optical polarization rotation.

In accordance with the present invention, it is identified that phase shifts between S and P polarization components of laser beam 292 are introduced by the bend induced birefringence of the set of optical fibers 102 and that the phase shifts may be compensated for by placing optical phase retardation elements in the optical path of the reflected beam 292 and that, furthermore, for detection of a Kerr rotation of the reflected laser beam 292 with a maximum SNR, the phase shift between the reflected P and S polarization components of laser beam 292 should be maintained 0 degrees modulo π. In one embodiment, an optical phase retardation element is utilized to optimize the Kerr signal from the MO disk 107 by bringing the reflected laser beam 292 in the absence of the Kerr signal and the orthogonally polarized Kerr components in phase. Doing so also minimizes the mode partition noise induced by the set of optical fibers 102 by operating at the bottom of a noise fringe. Optical phase retardation can be provided by an optical phase retardation element which resolves a light wave into two orthogonal linear polarization components and produces a phase shift between them. Ideally, optical elements that provide optical retardation will not polarize, nor will they induce an intensity change in a light beam passing therethrough; they will simply change the beam's polarization state. Elements that provide optical phase retardation can be of a fixed or variable variety and are typically available as birefringent, uniaxial materials having two different refractive indices. Such materials may comprise, for example, a uniaxial crystal, a quartz crystal, a mica crystal, nematic liquid crystal, an electro-optic material, a polymer, to name a few.

In accordance with the invention, it is identified that to achieve these conditions, the bend induced axes of the set of optical fibers 102 should preferably be aligned with the axes of the leaky beam splitter 232 such that the P polarization of the outgoing laser beam 291 is parallel to the in-plane bend induced axes of the set of optical fibers 102.

As discussed above, the set of optical fibers 102 may experience bending, for example, with a combination of in-plane bending and/or out-of-plane bending. In another embodiment illustrated in FIG. 1*b*, it is possible that the optical fibers 102 be routed such that minimal out-of-plane bending of the set of optical fibers 102 occurs, for example, if the optical fibers 102 are routed to exit the optics module 103 and are maintained along parallel planes having a between plane spacing equivalent to a spacing between the respective heads 106 to which they are routed (rather than fanning out at point B). In this embodiment, even with no out-of-plane bending, in-plane bending of the fibers may still occur, such as during normal routing of the set of optical fibers 102 from the optics module 103 to the heads 106.

Figure 2B:
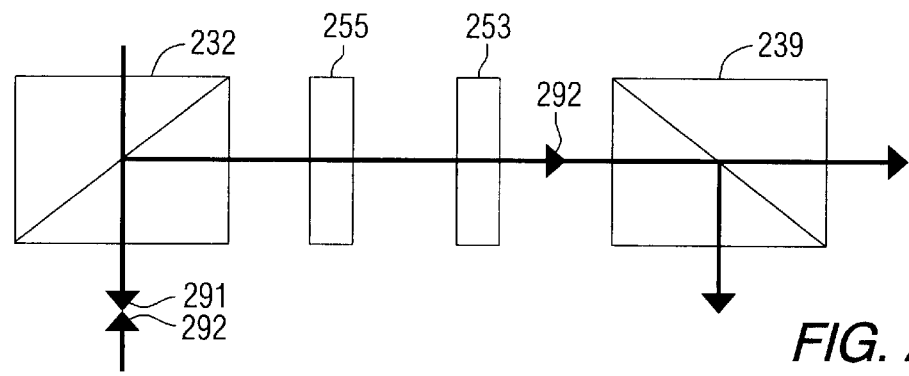
FIG. 2b illustrates one embodiment for providing variable optical phase retardation.

In one embodiment where minimal out-of-plane bending of the optical fibers 102 occurs, optical phase retardation is needed to compensate for the bend-induced birefringence. This compensation may be provided by an optical phase retarder 255 comprising a variable liquid crystal retarder, such as an LVR 100 VIS manufactured by Meadowlark Optics, Frederick, Colo. 80530. In this embodiment, the optical phase retarder 255 is used in combination with a first ½ wave plate 253, both of which are disposed at point BB in the optical path between the leaky beam splitter 232 and the polarizing beam splitter 239 (illustrated in FIGS. 2*a* and 2*b*). Preferably the optical axes of the optical phase retarder 255 are aligned at zero degrees relative to the optical axes of the leaky beam splitter 232, and the optical axes of the first ½ wave plate 253 are aligned at approximately 22.5 degrees relative to the axes of the polarizing beam splitter 239. This setting of the ½ wave plate rotates the polarization by approximately 45 degrees so as to produce equal powers on the photodetectors in the absence of a Kerr signal (i.e., a balanced condition). In one use of the variable liquid crystal retarder, a peak-to-peak input voltage in the range from approximately 0.1 volts to approximately 10.0 volts is applied, which has been shown to produce adequate compensation for in-plane induced stresses; slight variations of in-plane bending between the set of optical fibers 102 may require slightly different voltages. The particular voltage to be applied when a particular optical fiber 102 is utilized may be predetermined during a calibration phase. The voltage may be changed during the intervals between switching of the optical switch 104.

Figure 2C:
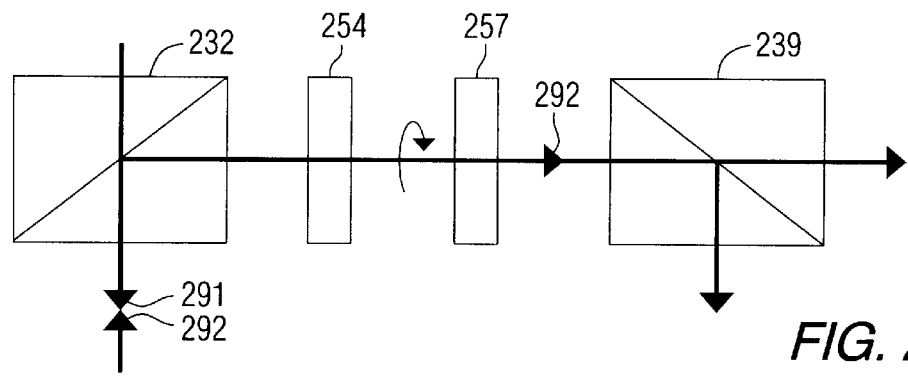
FIG. 2c illustrates another embodiment for providing variable optical phase retardation.
Figure 2D:
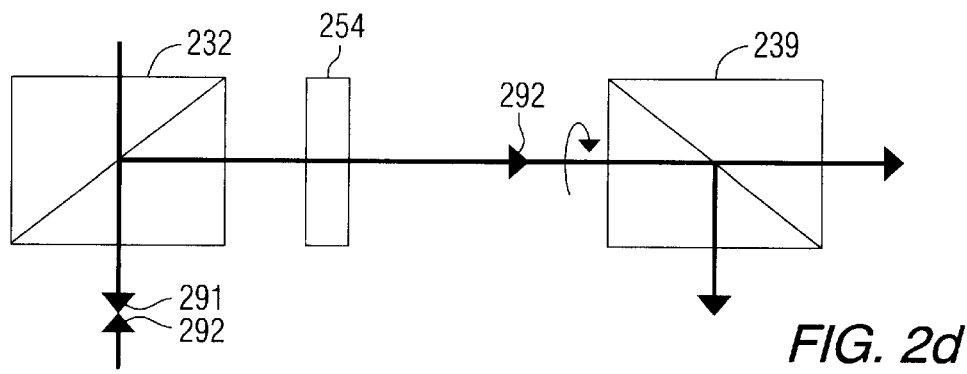
FIG. 2d illustrates another embodiment for providing variable optical phase retardation.

In another embodiment where minimal out-of-plane bending of the optical fibers 102 occurs, optical phase retardation may be provided by a combination of a ¼ wave plate 254 of a conventional variety and a dynamically rotating ½ wave plate 257, both of which are disposed between the leaky beam splitter 232 and the polarizing beam splitter 239 (illustrated in FIGS. 2*a* and 2*c*). In this embodiment, the optical axes of the ¼ wave plate 254 are aligned at forty five degrees relative to the optical axes of the leaky beam splitter 232, and the optical axes of the dynamically rotating ½ wave plate 257 rotate relative to the axes of the leaky beam splitter 232. The dynamically rotating ½ wave plate 257 may comprise a ½ wave plate coupled to an electromechanical or electro-micro-machined actuator to enable a desired rotation of the ½ wave plate. The particular rotation to be applied to the ½ wave plate 257 when a particular optical fiber 102 is utilized may be predetermined during a calibration phase. The rotation may be applied during the intervals between switching of the optical switch 104.

In still another embodiment, optical phase retardation is provided by a ¼ wave plate 254, which is disposed between the leaky beam splitter 232 and the polarizing beam splitter 239, with the optical axes of the ¼ wave plate 254 preferably aligned at forty five degrees relative to the optical axes of the leaky beam splitter 239 (illustrated in FIGS. 2*a* and 2*c*). In this version, the polarizing beam splitter 239 and its associated photodetectors are provided as a dynamically rotating subassembly. The dynamically rotating subassembly may comprise a polarizing beam splitter and photodetector module coupled to an electromechanical or electr-micro-machined actuator that enables a desired rotation of the subassembly. The particular rotation to be applied when a particular optical fiber 102 is utilized may be predetermined during a calibration phase and may be applied during the intervals between switching of the optical switch 104.

In the aforementioned embodiments, while static in-plane bend induced stress in low-birefringence optical fibers is compensated for, dynamic in-plane bend induced stress can be neglected as it is typically quite small, although it could in principle be compensated for as well with sufficiently fast compensation.

Figure 2E:
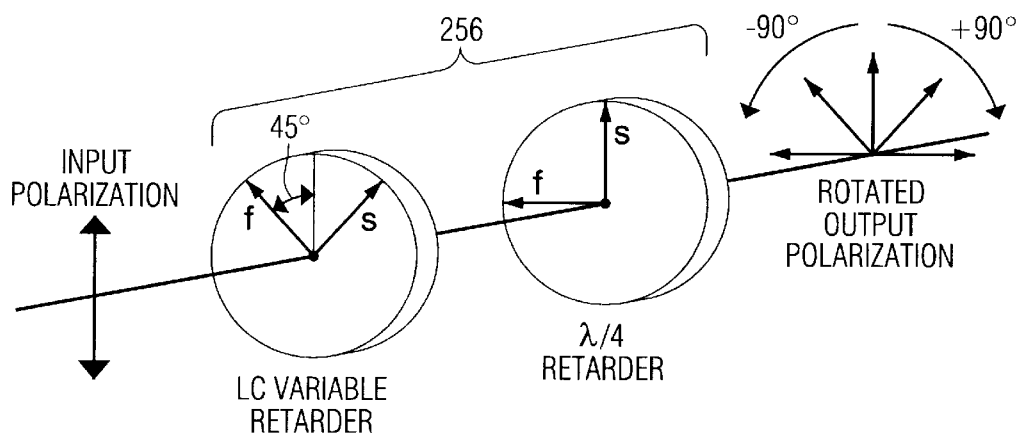
FIG. 2e illustrates an embodiment of an optical polarization rotator.

In the aforementioned embodiment of FIG. 1*a*, the set of optical fibers 102 are each routed around the optics module 103 to respective flying optical heads 106. Routing of the optical fibers 102 to the spaced apart heads 106 causes each optical fiber to traverse a slightly different path and, thus, experience different out-of-plane bending relative to exit point A. The out-of-plane bends cause each lo-bi optical fiber 102 to comprise bend induced axes that vary slightly in orientation relative to one another and/or with the leaky beam splitter 232. The variations between the out-of-plane bend induced axes of each optical fiber 102 can be accommodated for by using an optical polarization rotator 256 that is dynamically adjustable to rotate linear polarization of the outgoing laser beam 291, for example, by a ¼ wave plate retarder of a conventional variety coupled at about 45 degrees relative to the axes of a second variable liquid crystal retarder (illustrated in FIG. 2e). Polarization rotation is achieved by electrically controlling the retardance of the variable liquid crystal. A variable optical polarization rotator as described above is available as an LPR 100 660, which is manufactured by Meadowlark Optics, Frederick, Colo. 80530. The optical polarization rotator 256 may also be enabled through electro-mechanical rotation of a ½ wave plate. The amount of polarization rotation necessary for alignment to the induced axes of each optical fiber 102 can be determined during a calibration step such that, in operation, when switching between optical fibers 102 occurs, a control voltage corresponding to the particular optical fiber 102 being used is applied to the optical polarization rotator 256 in a feed-forward fashion to provide the required polarization rotation.

Without the aforementioned in-plane bending of the optical fibers 102, such as in an embodiment where the optical path traversed by the optical fibers 102 is maintained with minimal bending, the optical phase retardation would not necessarily be required. Without the aforementioned out-of-plane bending of the optical fibers 102, such as in an embodiment in which only a single lo-bi fiber 102 is carefully positioned in a planar mounting fixture and used to convey information to a single MO disk 107, the optical polarization rotation would not necessarily be required. In other embodiments, where both in-plane and out-of-plane bending are present, both optical phase retardation and optical polarization rotation may be required. It should be apparent, therefore, that the present invention should not be limited to the embodiments discussed above but only the scope of the ensuing claims.

Fiber End Face Reflections

Figure 2F:
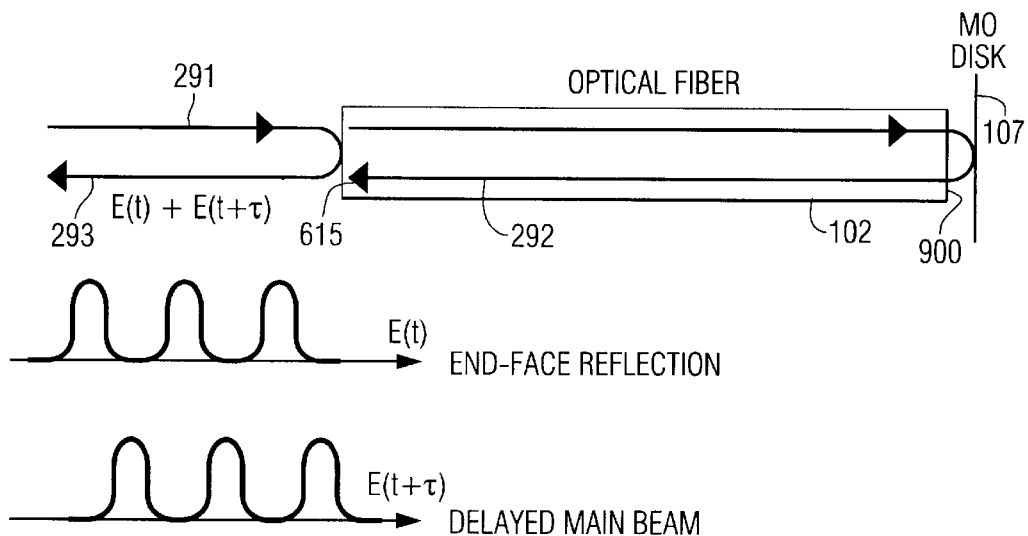
FIG. 2f illustrates an embodiment in which a laser source is pulsed.

In another embodiment illustrated in FIG. 2f, it has been identified that spurious reflections from the proximal ends (launch ends) 615 of the set of optical fibers 102 may degrade SNR, whereby the reflected beam 292 may co-propagate together with reflected beam 291 from the proximal ends 615, thereby resulting in a reflected beam 293 comprising $E(t)+E(t+\tau)$. In such a case, a laser source 231 may be of, for example, a Fabry-Perot (FP) type that is pulsed on and off with a duty cycle of about 50% or less and with a modulation frequency in the range from approximately 200 MHz to approximately 1.0 GHz Furthermore, the present invention identifies that pulsing the FP laser at increasingly higher frequencies (e.g., up to the relaxation oscillation frequency of the laser) causes the mode partition noise level in the optical system to progressively decrease since the laser mode partition dynamics change at higher frequencies. Pulsing of the laser 231 (of an FP type) also allows the reflected pulses of beam 293 to be time separated from the main signal-bearing beam 292, thereby reducing interference between the two pulse trains and thus effectively increasing the SNR of the detected Kerr signal. In the event that the two beams are allowed to overlap in time and interfere, then mode partition noise and laser phase noise could arise.

In one embodiment, with an optical fiber 102 index of refraction of about 1.5, the length of each of the optical fibers 102 is selected to be about 71.35 mm for a modulation frequency of approximately 350 MHz. The relationship between the modulation frequency (F) and the length (L) of the optical fibers 102 is embodied in the equation: $F=c(2i+1)/4Ln$ where $i=0,1,2,\ldots$, c=speed of light in vacuum, and n=refractive index of the fiber. The length of the set of optical fibers 102 is selected to ensure a proper time separation of the pulse trains. It is understood that in other embodiments, the length of the optical fiber 102 can be selected in accordance with other indices of refraction and other pulsing frequencies and, thus, the present invention should be limited only by the scope of the claims. Although the present invention describes use of low birefringence optical fibers, it is understood that pulsing of the laser and selecting an appropriate optical fiber length as described above may also be used to increase SNR in an embodiment utilizing high birefringence optical fibers (e.g., polarization maintaining optical fiber).

FIGS. 4a–4g illustrate a magneto-optical head in accordance with an embodiment of the present invention, in various views. The set of flying MO heads may be illustrated with reference to a single representative flying MO head 106. A single representative flying MO head 106 is shown in FIG. 4b to be positioned respectively above a surface recording layer 349 of one of the set of spinning MO disks 107. In one embodiment, the flying MO head 106 includes: a body 444, an air bearing surface 447, a steerable micro-machined mirror assembly 400, an objective lens 446, and a magnetic coil 460. In one embodiment, the magnetic coil 460 is a micro multi-turn coil positioned near the air-bearing surface 447 so as to generate a magnetic field that is: approximately 300 Oersteds of either polarity, reversible in a time of about 4 ns, and approximately perpendicular to the plane of the spinning MO disk 107. One example of a suitable steerable micro-machined mirror assembly 400 is described in commonly assigned U.S. patent application Ser. No. 08/844,207, now U.S. Pat. No. 6,061,323, issued on May 9, 2000, which is incorporated herein by reference in its entirety. Preferably, the magnetic coil should not interfere with the outgoing and reflected laser beams 291 and 292 during passage through the flying MO head 106 to the spinning MO disk 107, or vice versa. As determined by mechanical dimensions and/or optical properties of the aforementioned elements comprising the flying MO head 106, the body 444 includes a height of approximately 889 microns and a planar footprint area that corresponds to that of approximately 2032 microns×1600 microns. The low-birefringence optical fiber 102 is preferably coupled to the flying MO head 106 and is held along an axis of the body 444 by a v-groove 443 or other suitably dimensioned alignment feature. The optical fiber 102 is positioned within the v-groove 443 to preferably direct the outgoing laser beam 291 as an optimally focused spot of interest 340 onto the MO disk 107. The optical fiber 102 may be subsequently secured in place by using an ultraviolet curing epoxy or a similar adhesive. Use of the optical fiber 102 within a V-groove permits accurate alignment and delivery of the outgoing laser beam 291 relative to the small mirror assembly 400. The steerable micro-machined mirror assembly 400 and objective lens 446 are preferably compact and low mass so as to fit within a physical volume defined approximately the rectangular outer dimensions of the body 444 and yet sufficiently large to direct a full cross section of the outgoing and reflected laser beams 291 and 292 so that minimal power is lost and significant distortion and aberrations in the outgoing and reflected laser beams 291 and 292 are not introduced. The MO head 106 profile, weight, and design are further simplified through the use of the low-birefringence optical fibers 102 of the present invention, in that, a ¼ wave plate is not required as an additional optical component for use on the flying MO head 106 as is required when using polarization-maintaining optical fibers.

The steerable micro-machined mirror assembly 400 is preferably aligned in the representative optical path so as to direct the outgoing laser beam 291 through the objective lens 446 towards the MO disk 107 and so as to direct the reflected laser beam 292 from the MO disk 107 back to the laser optics assembly 101. In one embodiment, the objective lens 446 may be a microlens with a numerical aperture (NA) in the range of approximately 0.6–0.85. Because flying height above the air bearing surface 447 is maintained with a reasonably constant value, a focusing servo is not necessarily required.

As used in the magneto-optical storage and retrieval system 100, fine tracking and short seeks to nearby tracks are performed by rotating a reflective central mirror portion 420 (shown as hidden by dotted lines in FIG. 4a) of the steerable micro-machined mirror assembly 400 about a rotation axis constrained by a set of hinges 410 such that the propagation angle of the outgoing laser beam 291 is changed before transmission to the objective lens 446. The reflective central mirror portion 420 is rotated about axes formed by the hinges 410 by applying a differential voltage to drive electrodes. The differential voltage creates an electrostatic force that enables the focused spot of interest 340 to be moved in the radial direction 450 on the MO media 107. In one embodiment, the central mirror portion 420 rotates approximately +/−2 degrees, which is equivalent to approximately +/−4 tracks at the surface of the MO disk 107. Although, in one embodiment a movement of +/−4 tracks is disclosed, depending on the desired performance characteristics of the steerable micro-machined mirror 400 described above, a range of movement greater or fewer than +/−4 tracks is understood to also be possible. Consequently, movement of the focused spot of interest 340 across the MO disk 107 and detection of the reflected laser beam 292 may be used in storage and retrieval of 20 information, track following, and seeks from one data track to another data track. Coarse tracking may be maintained by adjusting a current to rotary actuator magnet and coil assembly 120 (FIG. 1a). The track following signals used to follow a particular track of the MO disk 107 may be derived using combined coarse and fine tracking servo techniques as conventionally known. For example, a sampled sector servo format may be used to define tracks. The servo format may include either embossed pits stamped into the MO disk 107 or magnetic domain orientations that are read similar to data marks. If embossed pits are used, an adder output circuit may be used to supplement the differential amplifier 237 (FIG. 2). Conventional multiple magnetic disk Winchester magnetic disk drives use a set of respective suspensions and actuator arms that move in tandem as one integral unit. Therefore, because each flying head of such an integral unit is fixed relative to another flying head, during track following of a particular magnetic disk surface, simultaneous track following of another magnetic disk surface is not possible. In contrast, irrespective of the movement of the set of actuator arms 105 and set of suspensions 130, a set of steerable micro-machined mirror assemblies 400 may be used to operate independently and thus permit track following and seeks so as to read and/or write information using more than one MO disk surface at any given time. Independent track following and seeks using the set of concurrently operating steerable micromachined assemblies 400 would preferably require a set of separate respective read channel and fine track electronics and mirror driving electronics. Because the aforementioned embodiment would also preferably require use of separate laser-optics assemblies 101, an optical switch 104 for switching between each of the separate optical paths would not necessarily be required.

Figure 5A:
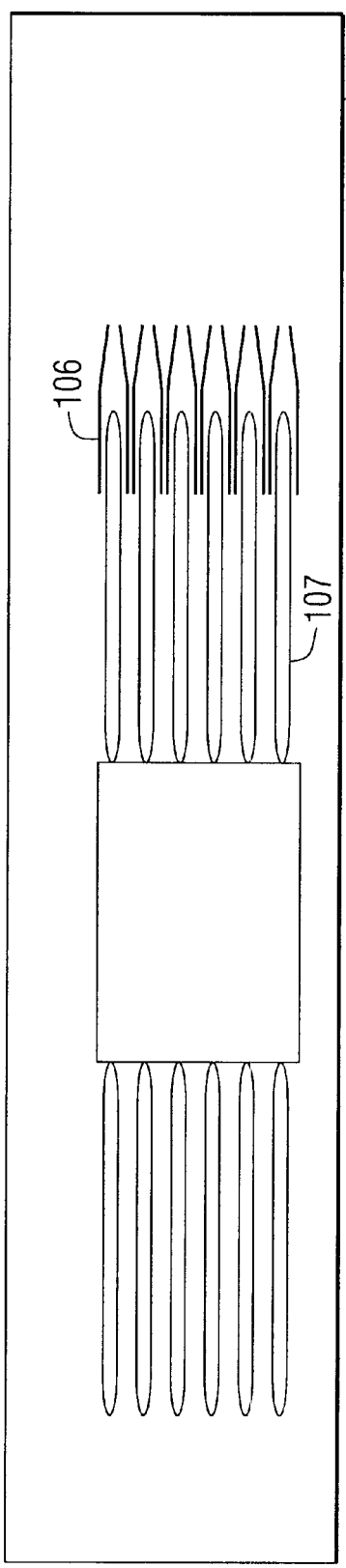
FIGS. 5a–b illustrate two embodiments of a magneto-optical disk drive.

FIG. 5a illustrates a magneto-optical data storage and retrieval system as part of a magneto-optical disk drive. In one embodiment, the magneto-optical system 100 comprises a compact high-speed and high-capacity MO disk drive 500 that includes an industry standard 5.25 inch half-height form factor (1.625 inch), at least six double-sided MO disks 107, and at least twelve flying MO heads 106. As discussed above, the flying MO heads 106 may be manufactured to include optical fibers 102 as part of a very small mass and low profile high NA optical system so as to enable utilization of multiple MO disks 107 at a very close spacing within the MO disk drive 500 and; therefore, to comprise a higher areal and volumetric and storage capacity than is permitted in an equivalent volume according to conventional approaches. In one embodiment, a spacing between each of the MO disks 107 is less than or equal to about 0.182 inches. In accordance with the present invention, it is identified that a polarization state may be conveyed by low birefringence optical fibers 102 with reduced noise over that when conveyed by polarization-maintaining optical fiber.

Figure 5B:
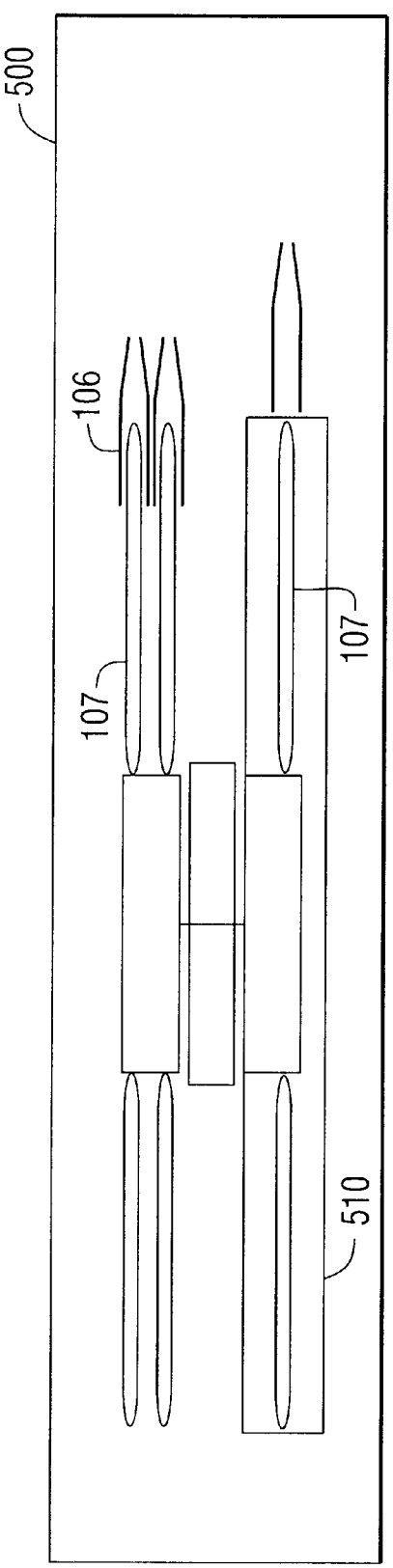

In an alternative embodiment shown in FIG. 5b, the half-height form factor MO disk drive 500 may include a removable MO disk cartridge portion 510 and two fixed internal MO disks 107. By providing the removable MO disk cartridge portion 510, the fixed internal and removable combination permits external information to be efficiently delivered to the MO disk drive 500 for subsequent transfer to the internal MO disks 107. The copied information may, subsequently, be recorded back onto the removable MO disk cartridge portion 510 for distribution to other computer systems. In addition, the removable MO disk cartridge portion 510 allows for very convenient and high speed back-up storage of the internal MO spinning disks 107. The fixed internal and removable combination also permits storage of data files on the removable MO disk cartridge portion 510 and system files and software applications on the internal MO spinning disks 107. In another alternative embodiment (not shown) an MO disk drive 500 may include: any number (including zero) of internal MO disks 107 and/or any number of MO disks 107 within any number of removable MO disk cartridge portions.

In accordance with the present invention, the use of a rotary actuator arm is not necessarily required. For example, a linear actuator arm may be used. The low profile optical paths disclosed by the present invention may be used to convey information to and from a storage location without requiring discrete objective optics (e.g., using a tapered optical fiber or an optical fiber with a lens formed on an end).

As similarly stated above, undesired laser noise can arise when a spurious reflection from conjugate points in the optical system interferes with the reflected laser beam 292 (FIG. 3). The conjugate points include the front end face (launch end 615) and back end face (head end 900) of the fiber 102. In particular, undesired laser noise occurs when the spurious reflection from a conjugate point co-propagates with the reflected signal-bearing laser beam 292 into the differential detector 240 (FIG. 2a) and when the spurious reflection and the reflected laser beam 292 assume approximately the same spatial distribution. Thus, the spurious reflection generally produces a reflected wavefront that spatially overlaps quite closely with the reflected laser beam 292 from the recording layer 349 of an MO disk 107.

RF Modulation for Reducing the Effects of Fiber Launch End 615 Reflections

As stated above, the laser source 231 may be modulated to reduce noise in the optical system by time-separating the spurious reflection E(t) (from fiber launch end 615) and the signal-bearing reflection 292 (from MO disk 107). Therefore, the interference between the two reflected beams is reduced, thereby increasing the SNR of the Kerr signal detected by differential detector 240 (FIG. 2a). As also stated above, the laser source 231 may include, for example, an FP laser or a stable single-frequency laser such as a DFB laser.

In accordance with the present invention, additional techniques are now discussed for eliminating the effects of the spurious reflection from the launch end 615 of optical fiber 102. These additional techniques include index matching, a cover slip technique, and angle polishing. These additional techniques may be performed by use of a laser source 231 that may be, for example, an FP laser or a stable single-frequency laser such as a DFB laser.

Index Matching for Reducing the Effects of Fiber Launch End 615 Reflections

An index matching approach may also be used to reduce the effects of the spurious reflection from the launch end 615 of the optical fiber 102. In one embodiment, the fiber 102 (or fiber bundle) is coupled to a GRIN lens 610 to form a collimator (container) 600, as shown in FIG. 6. An index-matching material 605 fills a gap between the GRIN lens 610 and the fiber 102. A capillary 602 supports the optical fiber 102 in the collimator 600. The GRIN lens 610 is used to focus the incident laser beam 291 into the fiber core via launch end 615 of optical fiber 102 and may have a pitch of, for example, approximately 0.23. The index-matching material 605 has a refractive index that is equal or nearly equal to the refractive index of the core of optical fiber 102, thereby eliminating or substantially reducing the Fresnel reflection from the surface of launch end 615 as well as from the inner GRIN lens surface 609 (to the extent that the GRIN lens refractive index is substantially close to the index of the fiber 102). The index-matching material 605 may comprise, for example, an optical epoxy, gel, or fluid. To the extent that the refractive index of the core of the fiber 102 does not match the refractive index of the index matching material 605, a difference in the refractive indices of $\Delta n=\pm 0.05$, may be tolerated between the fiber 102 core and the index matching material 605, thereby resulting in a maximum interface reflectivity of approximately 0.03%. Preferably, the index-matching material 605 has a high optical quality to prevent aberrations or scattering. In addition, the air-incident surface 608 of GRIN lens 610 is preferably coated with an anti-reflection (AR) coating to further minimize reflection. The AR coating is, for example, any suitable thin-film dielectric stack for reducing reflections.

It is noted that some amount of reflection from the outgoing laser beam 291 may still occur at the air-incident surface 608 even if this surface is AR-coated. If the outgoing laser beam 291 hits the air-incident surface 608 at perfectly normal incidence, then the reflection of the outgoing laser beam 291 at the surface 608 could overlap with the reflected signal-bearing beam 292. However, the probability is slim that the outgoing laser beam 291 will hit the surface 608 at perfectly normal incidence. Typically, in the various embodiments disclosed above, the outgoing laser beam 291 will hit the surface 608 at some angle of incidence as a result of the following. In order to properly focus or direct the laser beam 291 toward each associated launch end 615 of each fiber 102 in a fiber bundle in the optical system of FIG. 6, the laser beam 291 will hit the air-incident surface 608 with some angle of incidence. The laser beam 291 will hit the air-incident surface 608 at different angles of incidence depending on the coordinate of a particular launch end 615 that receives the laser beam 291.

As shown in FIG. 6, the index-matching material 605 causes the spurious reflection E(t) to not occur at the fiber launch end 615. The spurious reflection E(t) will instead occur at non-conjugate surface 609 at the interface between the index-matching material 605 and the GRIN lens 610 to the extent that a refractive index difference occurs at this surface 609. As a result, the spurious reflection E(t) does not spatially overlap with the signal-bearing beam 291 and also does not spatially overlap with the reflected signal-bearing beam 292 from the MO disk 107 (FIG. 3). Since the spurious reflection E(t) is spatially separated from the reflected signal-bearing beam 292, the differential detector 240 (FIG. 2a) will be able to detect the components of reflected signal-bearing beam 292 without interference from the spurious reflection E(t).

In contrast, if an index-matching material is not coupled to the fiber launch end 615, then a refractive index difference exists in the interface between the fiber launch end 615 and the adjacent air space. As a result of this refractive index difference, the spurious reflection E(t) generated at the fiber launch end 615 will spatially overlap with the reflected signal-bearing beam 292. This undesired spurious reflection E(t) is then transmitted into the differential detector 240 (FIG. 2a) along with the reflected signal-bearing beam 292.

Cover Slip Technique for Reducing the Effects of Fiber Launch End 615 Reflections FIG. 7 illustrates another index matching approach for reducing the effects of the spurious reflection E(t) at the launch end 615 of optical fiber 102, in accordance with another embodiment of the present invention. A collimator 750 includes a GRIN lens 715 and a cover slip 700 coupled to the optical fiber 102 and/or to a capillary 755 that supports the optical fiber 102. The cover slip 700 includes a back surface 765 that is typically cemented to the optical fiber 102 (and to the supporting capillary 755) with, for example, an optical cement having substantially the same refractive index as the cover slip. The cover slip 700 may be formed from a material such as glass or other suitable materials.

As further shown in FIG. 7, the cover slip 700 causes the spurious reflection E(t) to not occur at the fiber launch end 615. The spurious reflection E(t) will instead occur at the surface 760 (a non-conjugate point) of cover slip 700. As a result, the spurious reflection E(t) does not spatially overlap with the reflected signal-bearing beam 292 from the MO disk 107 (FIG. 3). Since the spurious reflection E(t) is spatially separated from the reflected signal-bearing beam 292, the differential detector 240 (FIG. 2a) will be able to detect the components of reflected signal-bearing beam 292 without interference from the spurious reflection E(t).

In an alternative embodiment, the front surface 760 of cover slip 700 may also be AR-coated to reduce the Fresnel reflection at the surface 760. The reflectance from AR-coated front surface 760 may be, for example, on the-order of about 0.25%.

As another alternative, the GRIN lens 715 may also be AR-coated to further minimize reflection in the optical system in FIG. 7. Since the refractive index of cover slip 700 (and corresponding mounting cement) are chosen to substantially match the refractive index of the core of optical fiber 102, the only reflection occurring in the optical system is the reflection from the AR-coated front surface 760 of cover slip 700. Since the front surface 760 does not contain a conjugate point in the optical system of FIG. 7, the spurious reflection E(t) from front surface 760 does not interfere with the signal-bearing beam 292, as mentioned above.

Figures 8, 9A:
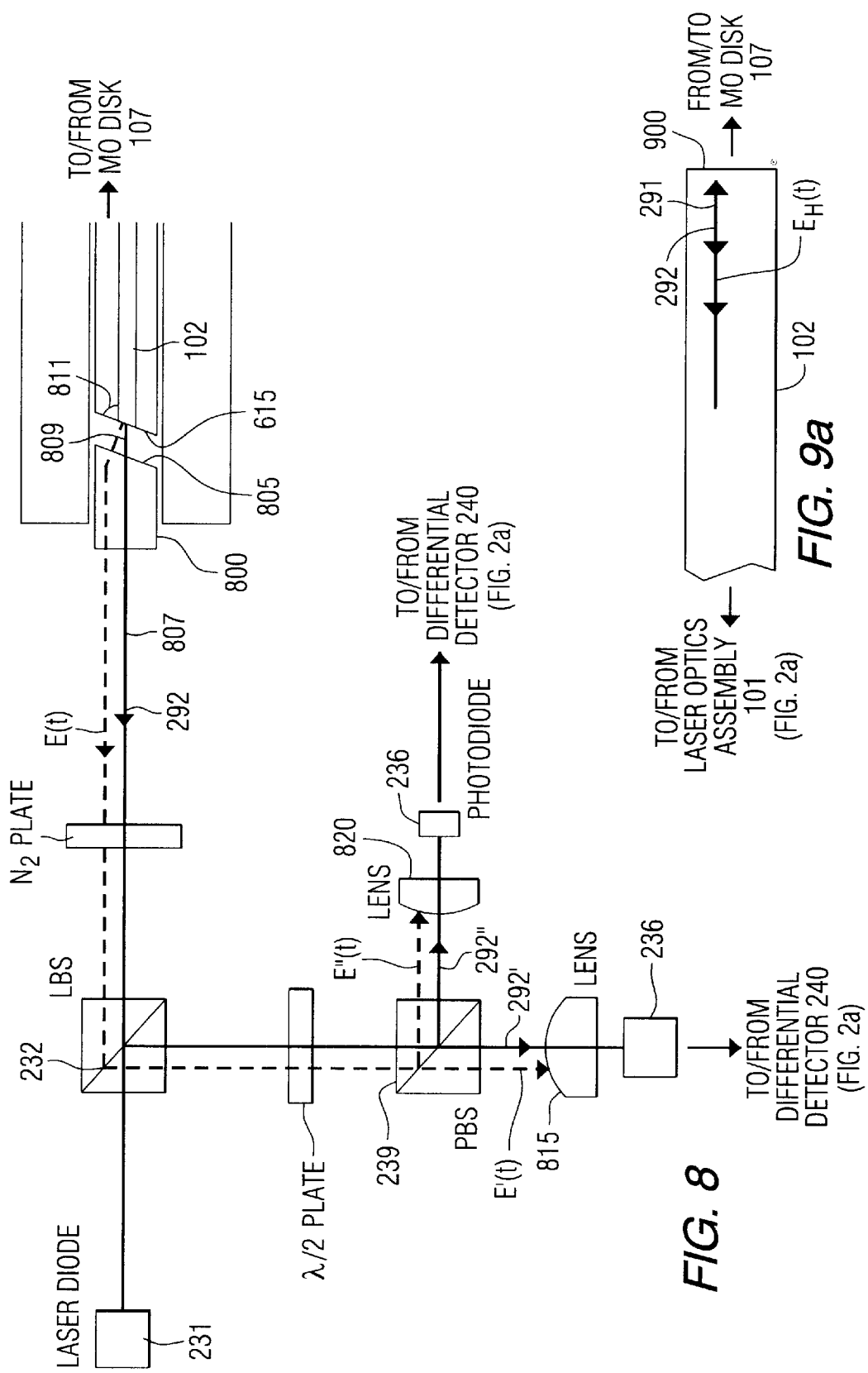
FIG. 8 is an illustration of a reflected signal-bearing beam propagating through a GRIN lens and an optical fiber having a launch end face with an altered configuration, in accordance with another embodiment of the present invention.
FIG. 9a is an illustration of a portion of an optical fiber wherein a spurious reflection occurs at the head end of the optical fiber.

Angle Polishing for Reducing the Effects of Fiber Launch End 615 Reflections In accordance with another embodiment of the present invention, an angle polishing approach may be used to reduce the effects of the spurious reflection E(t) from the launch end 615 of the optical fiber 102. The angle polishing approach can be used if the laser source 231 is implemented with, for example, an FP laser or a DFB laser. As shown in FIG. 8, a GRIN lens 800 is angle polished at a surface 805 so that the GRIN lens surface 805 is disposed at an acute angle value 809 with respect to an optical propagation axis 807. The GRIN lens surface 805 may be disposed at an angle ranging, for example, between approximately seven (7) degrees to approximately fifteen (15) degrees with respect to the optical propagation axis 807. In one embodiment, the fiber launch end 615 is also angle polished so that the fiber launch end 615 is disposed at an acute angle value 811 with respect to the optical propagation axis 807. To maximize the coupling of light between the GRIN lens 800 and the optical fiber 102, the angular values of the GRIN lens surface 805 and fiber launch end 615 are substantially equal with respect to the optical propagation axis 807.

By altering the configuration of the GRIN lens surface 805 and/or the fiber launch end 615, as shown in FIG. 8, the interference between the spurious reflection E(t) and the reflected signal-bearing beam 292 (from MO disk 107) is substantially reduced, since both reflections are spatially separated.

The beam component 292' (from reflected beam 292) is also spatially separated from noise component E'(t) (from spurious reflection E(t)) after passing through the polarizing beam splitter 239. The beam component 292' is then received by an MO detector lens 815 and by one of the photodiodes 236 (see also FIG. 2a), and is then processed by differential detector 240 (FIG. 2a). Similarly, the beam component 292" (from reflected beam 292) is spatially separated from noise component E"(t) (from spurious reflection E(t)) after passing through the polarizing beam splitter 239. The beam component 292" is then received by an MO detector lens 820 and by one of the photodiodes 236 (see also FIG. 2a), and is then processed by differential detector 240 (FIG. 2a).

The noise component E'(t) may be prevented from transmitting into the differential detector 240 by use of an opaque light blocking element (not shown) that includes an aperture. Thus, the reflected signal-bearing beam component 292' will propagate through the aperture and into the differential detector 240 (FIG. 2a), while the opaque light blocking element will block the noise component E'(t). Similarly, another opaque light blocking element may be used to block the noise component E"(t) while permitting the signal-bearing beam component 292" to propagate into the differential detector 240.

Alternatively, the opaque light blocking elements are not used in the optical system. If there is a small angular tilt between the reflection E(t) and the reflected signal-bearing beam 292, then the two waves will combine to produce a spatial interference pattern at the photodetector plane. The period of the pattern is given by Bragg's relation, $\Lambda g = \lambda/(2 \sin \theta)$, where $\sin \theta$ is the half-angle between the reflection E(t) and the beam 292. In the embodiment of FIG. 8, the polarizing beam splitter 239 in the differential detection system 240 is placed before the MO detector lens 815 and 820, so the two beam falling on either of the MO detectors (photo-diodes) 236 (FIG. 2a) will have the same polarization, leading to an intensity interference effect. For example, in FIG. 8 the half-angle at an MO detector 236 is approximately ten (10) degrees, which corresponds to a grating period of about 1.9 microns. For an MO detector size of approximately 300–400 microns, the average intensity will be typically sensed by each of the MO detectors 236 and laser noise effects will be minimized.

The angle polishing of GRIN lens surface 805 and/or fiber launch end 615 may be performed by use of, for example, various angle polishers available from Ultra Tec, Santa Ana, Calif. Other suitable polishers may also be used to alter the GRIN lens surface 805 and/or fiber launch end 615.

Alternatively, the fiber launch end 615 may be angle cleaved so that it is disposed at an acute angle with respect to the optical propagation axis 807. One example of a suitable instrument for cleaving the fiber launch end 615 is the Model FK12 Angled Cleaver which is manufactured by York Corporation, United Kingdom and is commercially available from Newport Corporation, Irvine, Calif.

Fiber Head End Reflection (Noise)

Reference is now made to FIG. 9a for discussion of the spurious reflection $E_H(t)$ that occurs at a fiber head end 900 of the optical fiber 102. The spurious reflection $E_H(t)$ is generated as a result of: (1) the reflection of the outgoing beam 291 from the fiber surface 900 on the head end, or (2) from some other optical component surface on the head. The spurious reflection $E_H(t)$ propagates back towards the optical switch 104 and may interact with the return signal-bearing beam 292 to produce excess noise in the detection channel. The nature of the noise depends on the type of laser source used. If a FP diode laser is used, then mode partition noise (MPN) is the dominant source of noise. MPN arises because the spurious reflection $E_H(t)$ travels a different optical path length before combining with the signal-bearing return light 292 in the detection module. If a DFB laser is used, then MPN is no longer of concern, but media noise may be amplified by mixing of the spurious reflection with the signal-bearing light. In addition, when using a DFB laser source, the small optical path difference may lead to excess laser phase noise. It is therefore important to implement a technique for eliminating (or significantly reducing) this unwanted spurious reflection.

Various techniques are now discussed for eliminating the effects of the spurious reflection $E_H(t)$ at the head end 900 of optical fiber 102. These techniques include angle cleaving or angle polishing, index matching, and coreless (or multimode) fiber splicing. These techniques are applicable while various types of laser sources 231, such as an FP laser or a DFB laser, are used to transmit light through the optical fiber 102.

Angle Cleaving for Reducing the Effects of Fiber Head End 900 Reflections

Figure 9B:
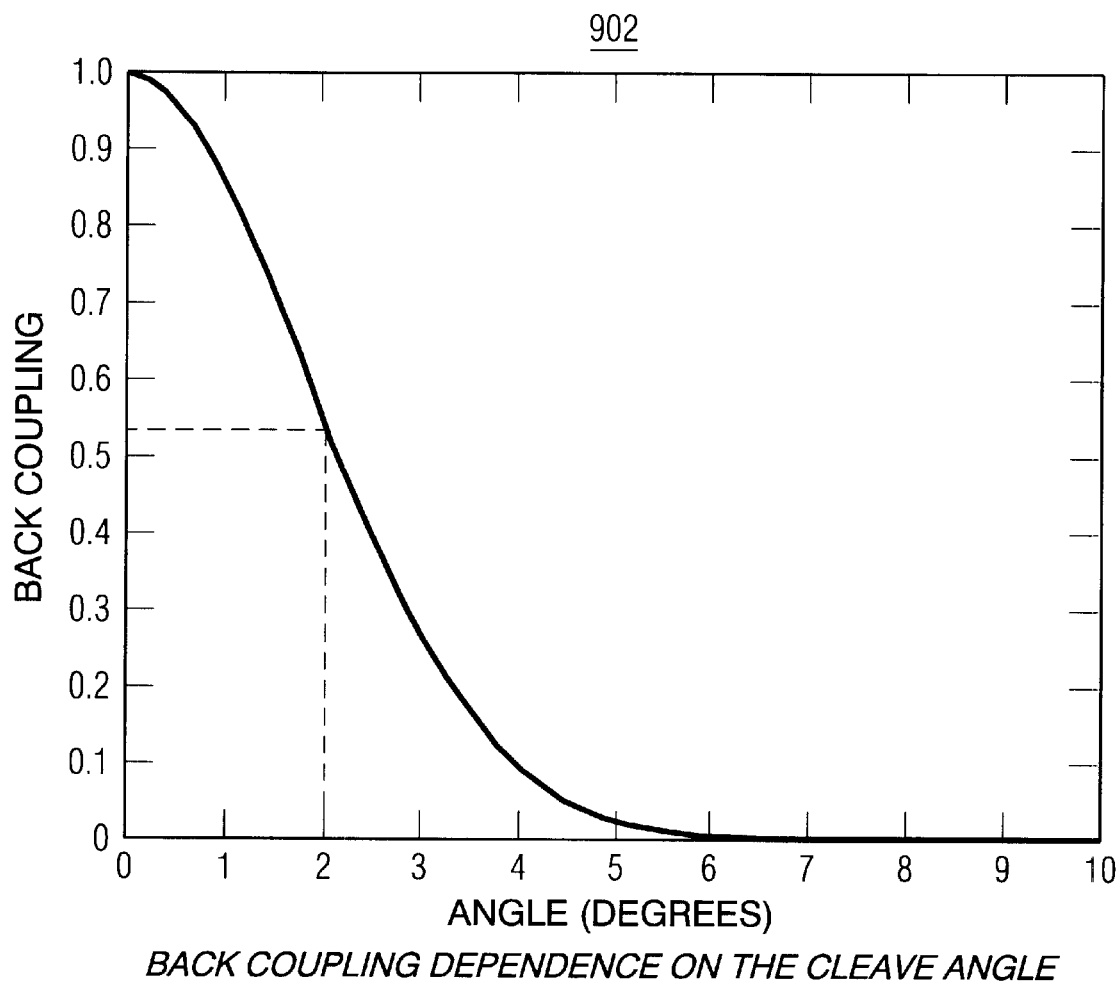
FIG. 9b is a graph illustrating the relative back-coupling efficiency for a fiber end face reflection from a fiber head end versus the angle amount in which the fiber head end is cleaved.

In accordance with another embodiment of the present invention, the effects of the spurious reflection $E_H(t)$ from the head end 900 of fiber 102 are eliminated by angle cleaving the fiber head end 900. The angular amount of the cleave formed on the fiber head end 900 with respect to an optical propagation axis 910 (FIG. 9c) determines the amount of the spurious reflection that is coupled back towards the fiber launch end 615. In FIG. 9b, a graph 902 shows the relative reflection amount from the fiber head end 900 versus the angle by which the fiber head end 900 is cleaved with respect to the optical propagation axis 910. If, for example, the fiber head end 900 is not angle cleaved, then approximately 100% of the spurious Fresnel reflection $E_H(t)$ is reflected back towards the launch end 615 of optical fiber 102. As another example, if the fiber head end 900 is angle cleaved at an angle of approximately two (2) degrees with respect to the optical propagation axis 910 (FIG. 9c), then approximately 55% of the spurious reflection $E_H(t)$ is reflected back towards the launch end 615 of optical fiber 102. If the fiber head end 900 is angle cleaved at an angle of approximately four (4) degrees with respect to the optical propagation axis 910 (FIG. 9c), then less than approximately 10% of the spurious reflection $E_H(t)$ is reflected back towards the launch end 615 of optical fiber 102. The fiber head end 900 is preferably cleaved in a range between approximately six (6) degrees to approximately fifteen (15) degrees with respect to optical propagation axis 910 so that the spurious reflection $E_H(t)$ that propagates back towards launch end 615 is essentially extinguished. Anti-reflection coating (AR) coating may also be applied to the fiber head end 900 for purposes of further reducing the Fresnel reflection at the fiber head end 900.

Figure 9C:
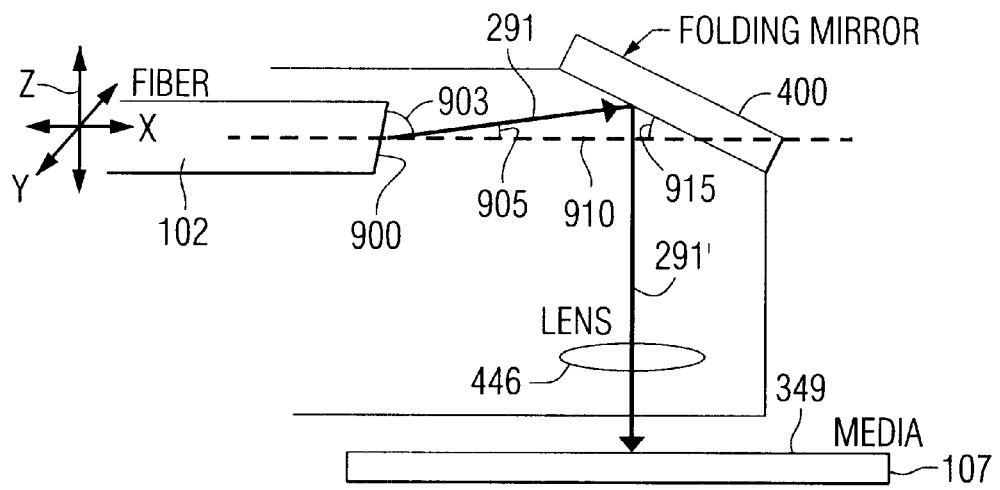
FIG. 9c illustrates an optical system having an optical fiber with a downward angle cleave, in accordance with another embodiment of the present invention.

FIG. 9c illustrates a fiber 102 with a head end 900 that has an angle cleave of, for example, about eight (8) degrees with respect to the optical propagation axis 910. The angle cleave value 903 causes the central ray of outgoing beam 291 to exit the head end 900 at an acute angle value 905 (e.g., about 4.0 degrees) with respect to the optical propagation axis 910. The outgoing beam 291 is then reflected from the steerable micro-machined mirror assembly 400 as a reflected beam 291' that propagates through objective lens 446 and that is directed at the surface recording layer 349 of MO disk 107. In order for the reflected beam 291' to be directed towards the surface recording layer 349 in a substantially perpendicular direction, as shown in FIG. 9c, the steerable micro-machined mirror assembly 400 is oriented at an appropriate angle 915 (e.g., about 43.0 degrees) with respect to the optical propagation axis 910. In one embodiment, the measurement of angle 915 is an acute angular value other than forty-five (45) degrees. The reflected beam 291' is directed perpendicularly towards the recording layer 349 so that light is efficiently coupled between the optical fiber 102 and MO disk 107. Furthermore, the position of optical fiber 102 may be adjusted in the X, Y, and/or Z directions for maximum fiber coupling.

Figure 9D:
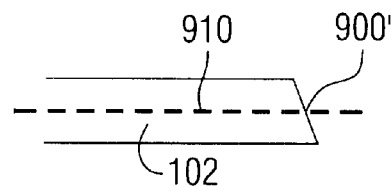
FIG. 9d illustrates an optical system having an optical fiber with an upward angle cleave, in accordance with another embodiment of the present invention.

Note that in FIG. 9c, the angle cleave of head end 900 faces downward. In another embodiment shown in FIG. 9d, an optical fiber 102 has a head end 900' with an angle cleave that faces upward. As a result, the angle 915 of steerable micro-machined mirror assembly 400 is set at an appropriate value so that the reflected beam 291' is directed perpendicularly towards recording surface 349 of MO disk 107.

Alternatively, the fiber head end 900 (FIG. 9c) and/or fiber head end 900' (FIG. 9d) may be altered with respect to the optical propagation axis 910 by angle polishing in a manner as similarly described above with reference to FIG. 8.

Figure 9E:
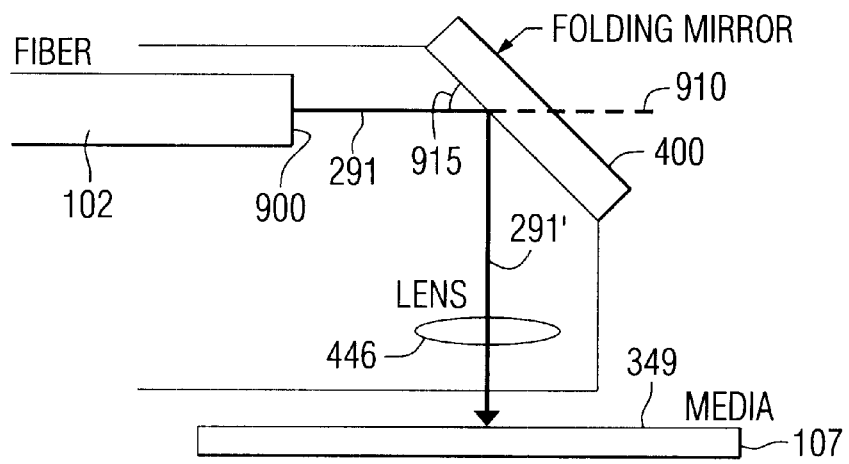
FIG. 9e illustrates an optical system having an optical fiber without an angle cleave, in accordance with another embodiment of the present invention.

In contrast, if angle cleaving (or angle polishing) is not performed on the head end 900 of optical fiber 102, then the outgoing beam 291 exits the head end 900 with a central ray that is substantially parallel to the optical propagation axis 910, as shown in FIG. 9e. In order for the reflected beam 291' to be directed towards surface recording layer 349 at a substantially perpendicular orientation, the value of angle 915 is typically about forty-five (45) degrees with respect to the optical propagation axis 910. The optical system shown in FIG. 9e is particularly useful if: (1) a DFB laser is used and (2) media noise and laser phase noise are negligible.

Index Matching for Reducing the Effects of Fiber Head End 900 Reflections

In accordance with another embodiment of the present invention, the effect of the spurious reflection $E_H(t)$ from the head end 900 of fiber 102 is eliminated by an index matching approach. As shown in FIG. 10a, a portion of the optical fiber 102 is attached into a slider 1000 by, for example, glue 1005. A glass plate 1010 is placed in the slider body 1000 at an orientation substantially perpendicular to the optical fiber 102. The gap between the fiber head end 900 and the glass plate 1010 is filled with epoxy, fluid, or gel 1015 or other suitable material having a refractive index substantially the same as the refractive index of the core of the fiber. To the extent that the refractive index of the core of the fiber 102 does not match the refractive index of the index matching material 1015, a difference in the refractive indices of $\Delta n=\pm 0.05$, may be tolerated between the fiber 102 core and the index matching material 1015, thereby resulting in a maximum interface reflectivity of approximately 0.03%.

As shown in FIG. 10b, the index matched fluid 1015 causes the spurious reflection $E_H(t)$ to not occur at the fiber head end 900. The spurious reflection $E_H(t)$ will instead occur at a surface 1012 of glass plate 1010 (i.e., a non-conjugate surface), while a second spurious reflection $E'_H(t)$ will occur at non-conjugate surface 1013. As a result, the spurious reflections $E_H(t)$ and $E'_H(t)$ do not couple back into the fiber. Since the spurious reflections $E_H(t)$ $E'_H(t)$ are effectively extinguished from the optical system, the differential detector 240 (FIG. 2a) will be able to detect the components of reflected signal-bearing beam 292 without interference from the spurious reflections $E_H(t)$ and $E'_H(t)$.

Figure 11B:
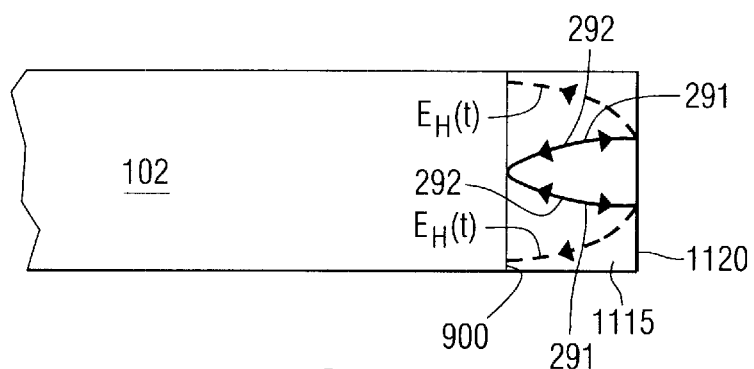

Fiber Splicing for Reducing the Effects of Fiber Head End 900 Reflections $E_H(t)$ In accordance with another embodiment of the present invention, the effect of the spurious reflection $E_H(t)$ from the head end 900 of fiber 102 is eliminated by another type of index matching approach as discussed with reference to FIGS. 11a to 11b. Referring first to FIG. 11a, a coreless fiber section 1100 is spliced on the head end of fiber 102. The coreless fiber section 1100 may, for example, have a diameter similar to that of the single-mode fiber 102 (e.g., 80 microns), and is coupled to the fiber 102 by, for example, fusion splicing. The coreless fiber section 1100 is then cut along lines 1105 so that portion 1110 of coreless fiber section 1100 is separated from portion 1115. Thus, the portion 1115 remains spliced to the fiber 102. In an alternative embodiment, a large-core multimode fiber (not shown) may be used in place of the coreless fiber. The length of spliced fiber portion 1115 is preferably chosen so that the radius of the outgoing beam 291 output at the face 1120 of portion 1115 is less than the diameter of coreless optical fiber 102. The portion 115 may have a length of, for example, about 100 microns. The refractive index of coreless fiber section 1100 (and portion 1115) substantially matches the refractive index of the core of optical fiber 102. To the extent that the refractive index of the core of the fiber 102 does not match the refractive index of the fiber portion 1115, a difference in the refractive indices of $\Delta n=\pm 0.05$, may be tolerated between the fiber 102 core and the spliced fiber portion 1115, thereby resulting in a maximum interface reflectivity of approximately 0.03%. As a result, the effect of the reflection from a conjugate point (i.e., head end 900) is significantly reduced due to the index matching, as discussed below. In addition, the light wave spatial distribution of outgoing beam 291 is not distorted in shape (e.g., circularity). If, in addition, AR coating is placed on the face of splice fiber surface 1120, then the Fresnel reflection from surface 1120 can be suppressed down to about 0.25%, resulting in a more efficient (i.e., lower loss) optical system in FIG. 11a.

If, during the splice process, the core size at the head end 900 (of optical fiber 102) changes due to the heating applied to the head end 900, then the effective mode field diameter of optical fiber 102 will increase. As a result, a proper objective lens may be implemented to compensate for an increase in the effective mode field diameter.

As shown in FIG. 11b, the spliced fiber portion 1115 causes the spurious reflection $E_H(t)$ to not occur at the fiber end face (head end 900). The spurious reflection $E_H(t)$ will instead occur at the interface between the surface 1120 and the adjacent air space. As a result, the spurious reflection $E_H(t)$ does not efficiently couple back into fiber 102 and is therefore effectively extinguished. Since the spurious reflection $E_H(t)$ is substantially eliminated from the optical system, the differential detector 240 (FIG. 2a) will be able to detect the components of reflected laser beam 292 without interference from the spurious reflection $E_H(t)$.

Figure 11C:
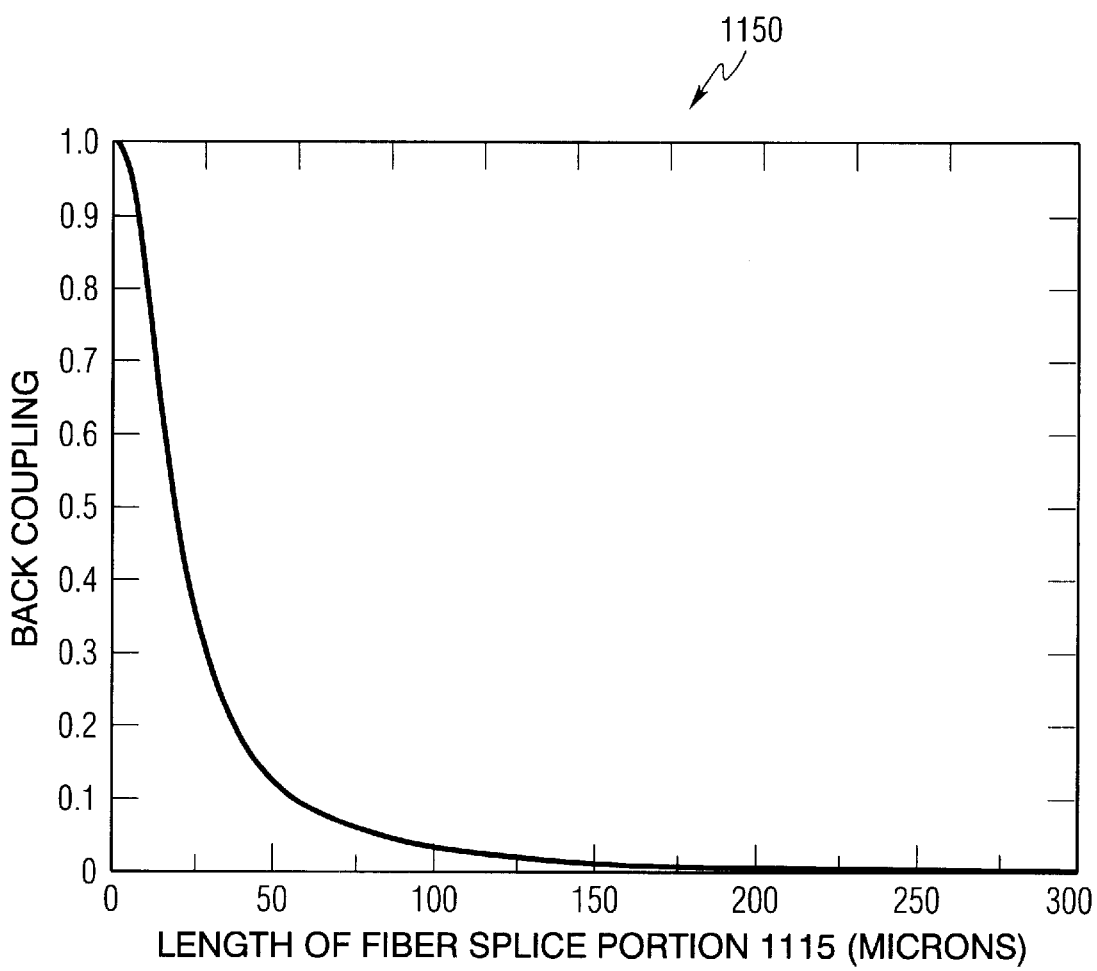
FIG. 11c is a graph showing the reflection at the fiber head end versus the length of a multi-mode fiber section that is spliced to an optical fiber.

FIG. 11c is a graph 1150 showing the reflection from the fiber head end 900 versus the length of the spliced fiber portion 1115. It is shown that the interference between the spurious reflection $E_H(t)$ at the fiber head end 900 and the laser beam 292 is substantially reduced if the spliced fiber portion 1115 has a length of at least approximately 100 microns.

In accordance with another embodiment of the present invention, the above-mentioned techniques for eliminating head end reflection are not required if the laser source 231 is implemented with a DFB laser and if both media noise and laser phase noise are sufficiently low in the optical system disclosed above.

It is understood that the present invention can find utility in a variety of environments, such as other types of optical drives, communications systems, and the like. Therefore, although the present invention has been described herein with reference to particular embodiments thereof, a latitude of modification, various changes and substitutions are intended in the foregoing disclosure, and it will be appreciated that in some instances some features of the invention will be employed without a corresponding use of other features without departure from the scope of the invention as set forth.

We claim:

1. A system for propagating a light signal between a laser source and an information storage location comprising:
    an optical element disposed between the laser source and the information storage location for transmitting the light signal;
    a refractive index matching means coupled to the optical element for compensating the light signal for the effects of at least one spurious reflection; and
    a controller coupled to the laser source for modulating the laser source at a particular frequency in order to reduce interference between the light signal and the at least one spurious reflection;
    wherein the index matching means comprises a gradient index (GRIN) lens disposed between the laser source and a launch end of the optical element, the GRIN lens being coupled to the optical element so as to leave a gap between an inside surface of the GRIN lens and the launch end, and an index matching material disposed in the gap, the index matching material having a refractive index approximately equal to a refractive index of the optical element.

2. The system of claim 1 wherein the index matching material is comprised of material selected from the group consisting of optical epoxy, gel, and fluid.

3. The system of claim 1 wherein the laser source is selected from the group of a Fabry-Perot laser, a stable single frequency laser source, and a distributed feedback laser.

4. A system for propagating a light signal between a laser source and an information storage location comprising:
    an optical element disposed between the laser source and the information storage location for transmitting the light signal;
    a refractive index matching means coupled to the optical element for compensating the light signal for the effects of at least one spurious reflection; and
    a controller coupled to the laser source for modulating the laser source at a particular frequency in order to reduce interference between the light signal and the at least one spurious reflection;
    wherein the index matching means comprises a gradient index (GRIN) lens disposed between the laser source and a launch end of the optical element, the GRIN lens being coupled to the optical element so as to leave a gap between an inside surface of the GRIN lens and the launch end, and a cover slip disposed in the gap, the cover slip being coupled to the launch end and having a refractive index approximately equal to a refractive index of the optical element.

5. The system of claim 4 wherein the cover slip is comprised of glass.

6. A system for propagating a light signal between a laser source and an information storage location comprising:
    an optical element disposed between the laser source and the information storage location for transmitting the light signal;
    a refractive index matching means coupled to the optical element for compensating the light signal for the effects of at least one spurious reflection; and
    a controller coupled to the laser source for modulating the laser source at a particular frequency in order to reduce interference between the light signal and the at least one spurious reflection;
    wherein the index matching means comprises a glass plate disposed between a head end of the optical element and the information storage location so as to leave a gap between the glass plate and the head end, and an index matching material disposed in the gap, the index matching material having a refractive index approximately equal to a refractive index of the optical element.

7. A system for propagating a light signal between a laser source and an information storage location comprising:
    an optical element disposed between the laser source and the information storage location for transmitting the light signal;
    a refractive index matching means coupled to the optical element for compensating the light signal for the effects of at least one spurious reflection; and
    a controller coupled to the laser source for modulating the laser source at a particular frequency in order to reduce interference between the light signal and the at least one spurious reflection;
    wherein the particular frequency is determined by the equation $F=c(2i+1)/4Ln$, wherein c is the speed of light in a vacuum, L is a length of the optical element, n is a refractive index of the optical element, and i is an integer having a value of at least zero.

8. A system for propagating a light signal between a laser source and an information storage location comprising:
    an optical element disposed between the laser source and the information storage location for transmitting the light signal;

an optical fiber splicing means coupled to the optical element for compensating the light signal for the effects from at least one spurious reflection; and a controller means coupled to the laser source for modulating the laser source at a particular frequency in order to reduce interference between the light signal and the at least one spurious reflection;

wherein the fiber splicing means comprises a coreless fiber section having a diameter approximately equal to a diameter of the optical element, the coreless fiber section being coupled to the optical element and disposed between a head end of the optical element and the information storage location, wherein the length of the coreless fiber section is such that the radius of the light signal when exiting an outer face of the coreless fiber section is approximately less than the diameter of the coreless fiber section, and wherein the coreless fiber section has a refractive index approximately equal to a refractive index of the optical element.

9. The system of claim 8 therein the coreless fiber section is replaced with a large-core multimode fiber.

10. The system of claim 8 wherein the laser source is selected from the group consisting of a Fabry-Perot laser, a stable single frequency laser source, and a distributed feedback laser.

11. A system for propagating a light signal between a laser source and an information storage location comprising:

an optical element disposed between the laser source and the information storage location for transmitting the light signal;

an optical fiber splicing means coupled to the optical element for compensating the light signal for the effects from at least one spurious reflection; and a controller means coupled to the laser source for modulating the laser source at a particular frequency in order to reduce interference between the light signal and the at least one spurious reflection;

wherein the particular frequency is determined by the equation F=c(2i+1)/4Ln, wherein c is the speed of light in a vacuum, L is a length of the optical element, n is a refractive index of the optical element, and i is an integer having a value of at least zero.

12. A method of propagating a light signal between a laser source and an information storage location comprising:

transmitting the light signal across an optical element;

compensating the light signal for the effects from at least one spurious reflection from the optical element via refractive index matching; and modulating the laser source at a particular frequency in order to reduce interference between the light signal and the at least one spurious reflection;

wherein the step of compensating the light signal from at least one spurious reflection comprises focusing the light signal into a launch end of the optical element via a gradient index (GRIN) lens through an index matching material having a refractive index approximately equal to a refractive index of the optical element.

13. The method of claim 12 wherein the index matching material is comprised of material selected from the group consisting of optical epoxy, gel, and fluid.

14. The system of claim 12 wherein the laser source is selected from the group consisting of a Fabry-Perot laser, a stable single frequency laser source, and a distributed feedback laser.

15. A method of propagating a light signal between a laser source and an information storage location comprising:

transmitting the light signal across an optical element;

compensating the light signal for the effects from at least one spurious reflection from the optical element via refractive index matching; and modulating the laser source at a particular frequency in order to reduce interference between the light signal and the at least one spurious reflection;

wherein the step of compensating the light signal from at least one spurious reflection comprises focusing the light signal into a launch end of the optical element via a gradient index (GRIN) lens through a cover slip having a refractive index approximately equal to a refractive index of the optical element.

16. The method of claim 15 wherein the cover slip is comprised of glass.

17. A method of propagating a light signal between a laser source and an information storage location comprising:

transmitting the light signal across an optical element;

compensating the light signal for the effects from at least one spurious reflection from the optical element via refractive index matching; and modulating the laser source at a particular frequency in order to reduce interference between the light signal and the at least one spurious reflection;

wherein step of compensating the light signal from at least one spurious reflection comprises, upon the light signal exiting a head end of the optical element, passing the light signal through an index matching material having a refractive index approximately equal to a refractive index of the optical element.

18. A method of propagating a light signal between a laser source and an information storage location comprising:

transmitting the light signal across an optical element;

compensating the light signal for the effects from at least one spurious reflection from the optical element via refractive index matching; and modulating the laser source at a particular frequency in order to reduce interference between the light signal and the at least one spurious reflection;

wherein the particular frequency is determined by the equation F=c(2i+1)/4Ln, wherein c is the speed of light in a vacuum, L is a length of the optical element, n is a refractive index of the optical element, and i is an integer having a value of at least zero.

19. A method of propagating a light signal between a laser source and an information storage location comprising:

transmitting the light signal across an optical element;

compensating the light signal for the effects from at least one spurious reflection from the optical element via optical fiber splicing; and modulating the laser source at a particular frequency in order to reduce interference between the light signal and the at least one spurious reflection;

wherein step of compensating the light signal from at least one spurious reflection comprises coupling a coreless fiber section having a diameter approximately equal to a diameter of the optical element, the coreless fiber section being disposed between a head end of the optical element and the information storage location, wherein the length of the coreless fiber section is such that the radius of the light signal when exiting an outer face of the coreless fiber section is approximately less than the diameter of the coreless fiber section, and wherein the coreless fiber section has a refractive index approximately equal to a refractive index of the optical element.

20. The method of claim 19 wherein the coreless fiber section is replaced with a large-core multimode fiber.

21. The system of claim 19 wherein the laser source is selected from the group consisting of a Fabry-Perot laser, a stable single frequency laser source, and a distributed feedback laser.

22. A method of propagating a light signal between a laser source and an information storage location comprising:

transmitting the light signal across an optical element;

compensating the light signal for the effects from at least one spurious reflection from the optical element via optical fiber splicing; and modulating the laser source at a particular frequency in order to reduce interference between the light signal and the at least one spurious reflection;

wherein the particular frequency is determined by the equation $F=c(2i+1)/4Ln$, wherein c is the speed of light in a vacuum, L is a length of the optical element, n is a refractive index of the optical element, and i is an integer having a value of at least zero.

* * * * *

UNITED STATES PATENT AND TRADEMARK OFFICE
CERTIFICATE OF CORRECTION

PATENT NO. : 6,587,421 B1
DATED : July 1, 2003
INVENTOR(S) : Jeffrey P. Wilde et al.

It is certified that error appears in the above-identified patent and that said Letters Patent is hereby corrected as shown below:

Title page,
Item [56], References Cited, "350/98 WG" should read -- 350/96 WG --.

Column 1,
Line 66, "bear" should read -- beam --.

Column 10,
Line 49, "electr-micro-machined" should read -- electro-micro-machined --.

Column 13,
Line 40, "20" should be deleted.

Column 20,
Line 48, "115" should read -- 1115 --.

Column 23,
Line 20, "therein" should read -- wherein --.

Signed and Sealed this

Fourth Day of November, 2003

JAMES E. ROGAN
*Director of the United States Patent and Trademark Office*